US012118940B2

(12) United States Patent
Fujimura et al.

(10) Patent No.: US 12,118,940 B2
(45) Date of Patent: Oct. 15, 2024

(54) CONTROL METHOD OF DISPLAY DEVICE, AND DISPLAY DEVICE

(71) Applicant: JOLED INC., Tokyo (JP)

(72) Inventors: Hiroshi Fujimura, Tokyo (JP); Hitoshi Tsuge, Tokyo (JP)

(73) Assignee: JDI DESIGN AND DEVELOPMENT G.K., Tokyo (JP)

( * ) Notice: Subject to any disclaimer, the term of this patent is extended or adjusted under 35 U.S.C. 154(b) by 0 days.

(21) Appl. No.: 18/334,930

(22) Filed: Jun. 14, 2023

(65) Prior Publication Data

US 2023/0410747 A1 Dec. 21, 2023

(30) Foreign Application Priority Data

Jun. 16, 2022 (JP) ................................ 2022-097279
Jun. 22, 2022 (JP) ................................ 2022-100511

(51) Int. Cl.
*G09G 3/3233* (2016.01)

(52) U.S. Cl.
CPC ... *G09G 3/3233* (2013.01); *G09G 2300/0413* (2013.01); *G09G 2300/0819* (2013.01); *G09G 2300/0852* (2013.01); *G09G 2320/0247* (2013.01)

(58) Field of Classification Search
CPC ......... G09G 3/3233; G09G 2300/0413; G09G 2300/0819; G09G 2300/0852; G09G 2320/0247; G09G 2300/0842; G09G 2300/0861; G09G 2310/0251; G09G 2320/0257; G09G 2320/0266
See application file for complete search history.

(56) References Cited

U.S. PATENT DOCUMENTS

2018/0350304 A1* 12/2018 Ishii ..................... G09G 3/3258
2019/0014292 A1* 1/2019 Ishii ..................... H10K 59/131
2019/0108789 A1* 4/2019 Tsuge .................. G09G 3/3233
2023/0154403 A1* 5/2023 Kang ................ H10K 59/1216 345/211
2023/0230534 A1* 7/2023 Koh ......................... G09G 3/32 345/55
2023/0368732 A1* 11/2023 Lee ...................... G09G 3/3233

FOREIGN PATENT DOCUMENTS

JP 2012-013741 1/2012

* cited by examiner

*Primary Examiner* — Premal R Patel
(74) *Attorney, Agent, or Firm* — Greenblum & Bernstein, P.L.C.

(57) ABSTRACT

A control method is a method of a display device including a plurality of pixel circuits. Each of the pixel circuits includes a light emitting element, a drive transistor, and a pixel capacitance. The drive transistor includes a gate and a source. A frame period includes a first subframe period and at least one second subframe period. In the first subframe period, the control method includes: (A) applying a first initialization potential to the source; (B) writing a signal into the pixel capacitance; and (C) causing the light emitting element to emit light. In each of the at least one second subframe period, the control method includes: (D) maintaining the light emitting element in a non-emission state; (E) applying a second initialization potential to the source in (D); and (F) causing the light emitting element to emit light.

23 Claims, 32 Drawing Sheets

CONTROL METHOD OF DISPLAY DEVICE, AND DISPLAY DEVICE

CROSS REFERENCE TO RELATED APPLICATIONS

The present application is based on and claims priority of Japanese Patent Application No. 2022-097279 filed on Jun. 16, 2022, and Japanese Patent Application No. 2022-100511 filed on Jun. 22, 2022. The entire disclosures of the above-identified applications, including the specifications, drawings and claims are incorporated herein by reference in their entirety.

FIELD

The present disclosure relates to a control method of a display device and to the display device.

BACKGROUND

A display device, such as an organic electro luminescence (organic EL) display, repeats a cycle of a non-emission period in which an organic EL element emits no light (or stops emission) and an emission period in which the organic EL element emits light. The cycle of these periods is repeated for the purpose of initializing the potential of a source of a drive transistor included in a pixel circuit and writing a signal corresponding to an image. Such a cycle of emission and non-emission at a frequency of 60 Hz or lower results in visible flicker (screen flicker).

A subframe drive method is known as an anti-flicker measure. By this method, a frame period is divided into a plurality of subframe periods by inserting a non-emission period into an emission period (see Patent Literature (PTL) 1, for example). PTL 1 discloses that such a subframe drive method is used to prevent flicker.

CITATION LIST

Patent Literature

PTL 1: Japanese Unexamined Patent Application Publication No. 2012-13741

SUMMARY

Technical Problem

The aforementioned drive method can prevent flicker for a high dynamic range (HDR) image, but fail to fully prevent flicker for a low dynamic range (LDR) image. This phenomenon results from delayed emission caused by a bootstrapping operation performed after a signal is written into a pixel circuit. For the HDR image, the emission intensity after the signal writing is similar to that after the non-emission period because the delay of emission is short. In contrast, for the LDR image, the emission intensity after the signal writing is lower than that after the non-emission period because the delay of emission is long. For this reason, flicker cannot be fully prevented for the LDR image.

In response to the above issue, it is an object of the present disclosure to provide a control method of a display device and the display device that are capable of preventing flicker even for an LDR image.

Solution to Problem

In order to achieve the above-described object, in accordance with an aspect of the present disclosure, a control method of a display device including a plurality of pixel circuits, each of the plurality of pixel circuits including a light emitting element, a drive transistor, and a pixel capacitance, the drive transistor including a gate, a source, and a drain, the light emitting element being connected to the source, one end of the pixel capacitance being connected to the gate, and another end of the pixel capacitance being connected to the source, a frame period during which one image continues to be displayed by the display device including a first subframe period and at least one second subframe period that follows the first subframe period, the control method including: in the first subframe period, (A) applying a first initialization potential, which is predetermined, to the source; (B) writing a signal corresponding to the one image into the pixel capacitance after (A); and (C) causing the light emitting element to emit light after (B), and in each of the at least one second subframe period, (D) maintaining the light emitting element in a non-emission state; (E) applying a second initialization potential, which is predetermined, to the source in (D); and (F) causing the light emitting element to emit light after (D).

In order to achieve the above-described object, in accordance with another aspect of the present disclosure, a display device includes: a plurality of pixel circuits; and a control device that controls the plurality of pixel circuits, wherein each of the plurality of pixel circuits includes a light emitting element, a drive transistor, and a pixel capacitance, the drive transistor includes a gate, a source, and a drain, the light emitting element is connected to the source, one end of the pixel capacitance is connected to the gate, and another end of the pixel capacitance is connected to the source, a frame period during which one image continues to be displayed by the display device includes a first subframe period and at least one second subframe period that follows the first subframe period, in the first subframe period, the control device: applies a first initialization potential, which is predetermined, to the source; and causes the light emitting element to emit light, by applying a signal corresponding to the one image to the pixel capacitance after applying the first initialization potential, and in each of the at least one second subframe period, the control device: maintains the light emitting element in a non-emission state; applies a second initialization potential, which is predetermined, to the source when the light emitting element is in the non-emission state; and switches the light emitting element from the non-emission state to an emission state.

In order to achieve the above-described object, in accordance with still another aspect of the present disclosure, a control method of a display device, the display device including a plurality of pixel circuits, each of the plurality of pixel circuits including a light emitting element, a drive transistor, and a pixel capacitance, the drive transistor including a gate, a source, and a drain, the light emitting element being connected to the source, one end of the pixel capacitance being connected to the gate, and another end of the pixel capacitance being connected to the source, a frame period during which one image continues to be displayed by the display device including a first subframe period and at least one second subframe period that follows the first subframe period, each of the at least one second subframe period being equal in length to the first subframe period, the control method includes: in the first subframe period, (H) maintaining the light emitting element in a non-emission state for a non-emission period that is predetermined; and (I) causing the light emitting element to emit light after (H), and in each of the at least one second subframe period, (J) maintaining the light emitting element in the non-emission state for the non-emission period; and (K) causing the light emitting element to emit light after (J), wherein (H) includes: (L) applying an initialization potential, which is predetermined, to the source; (M) writing a signal corresponding to the one image to the pixel capacitance after (L); and (N) applying the initialization potential to the source for an initialization period that is predetermined, after (M), (J) includes (O) applying the initialization potential to the source, and a period from a start of the first subframe period to an end of (N) is equal in length to a period from a start of each of the at least one second subframe period to an end of (O).

In order to achieve the above-described object, in accordance with still another aspect of the present disclosure, a display device includes: a plurality of pixel circuits; and a control device that controls the plurality of pixel circuits, wherein each of the plurality of pixel circuits includes a light emitting element, a drive transistor, and a pixel capacitance, the drive transistor includes a gate, a source, and a drain, the light emitting element is connected to the source, one end of the pixel capacitance is connected to the gate, and another end of the pixel capacitance is connected to the source, a frame period during which one image continues to be displayed by the display device includes a first subframe period and at least one second subframe period that follows the first subframe period, each of the at least one second subframe period is equal in length to the first subframe period, the control device includes: a first emission stopper that maintains the light emitting element in a non-emission state for a non-emission period that is predetermined, in the first subframe period; a first emitter that causes the light emitting element to emit light by supplying a current to the light emitting element, in the first subframe period; a second emission stopper that maintains the light emitting element in the non-emission state for the non-emission period, in each of the at least one second subframe period; and a second emitter that causes the light emitting element to emit light by supplying a current to the light emitting element, in each of the at least one second subframe period, the first emission stopper includes: a first initializer that applies an initialization potential, which is predetermined, to the source for an initialization period that is predetermined; a writer that writes a signal corresponding to the one image to the pixel capacitance; and a second initializer that applies the initialization potential to the source, the second emission stopper includes a third initializer that applies the initialization potential to the source for an initialization period that is predetermined, and a period from a start of the first subframe period to an end of application of the initialization potential by the second initializer is equal in length to a period from a start of each of the at least one second subframe period to an end of application of the initialization potential by the third initializer.

In order to achieve the above-described object, in accordance with still another aspect of the present disclosure, a display device includes: a plurality of pixel circuits; at least one dummy pixel circuit; and a control device that controls the plurality of pixel circuits, wherein each of the plurality of pixel circuits includes a light emitting element, a drive transistor, and a pixel capacitance, the drive transistor includes a gate, a source, and a drain, the light emitting element is connected to the source, one end of the pixel capacitance is connected to the gate, and another end of the pixel capacitance is connected to the source, each of the at least one dummy pixel circuit includes a capacitive element, and the control device includes an initializer that applies an initialization potential, which is predetermined, to the source of the drive transistor included in at least one pixel circuit among the plurality of pixel circuits and to the capacitive element included in each of the at least one dummy pixel circuit.

Advantageous Effects

The present disclosure can provide a control method of a display device and the display device that are capable of preventing flicker even for an LDR image.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, certain exemplary embodiments will be described in detail with reference to the accompanying Drawings. The following embodiments are specific examples of the present disclosure. The numerical values, shapes, materials, elements, arrangement and connection configuration of the elements, etc., described in the following embodiments are merely examples, and are not intended to limit the present disclosure. Among elements in the following embodiments, those not described in any one of the independent claims indicating the broadest concept of the present disclosure are described as optional elements.

Note that the respective figures are schematic diagrams and are not necessarily precise illustrations. Additionally, components that are essentially the same share like reference signs in the figures. Accordingly, overlapping explanations thereof are omitted or simplified.

Embodiment 1

The following describes a display device and a control method of the display device according to Embodiment 1. The present embodiment describes an example where the display device includes an organic EL element.

[1-1. Configuration of Display Device]

Figure 1:
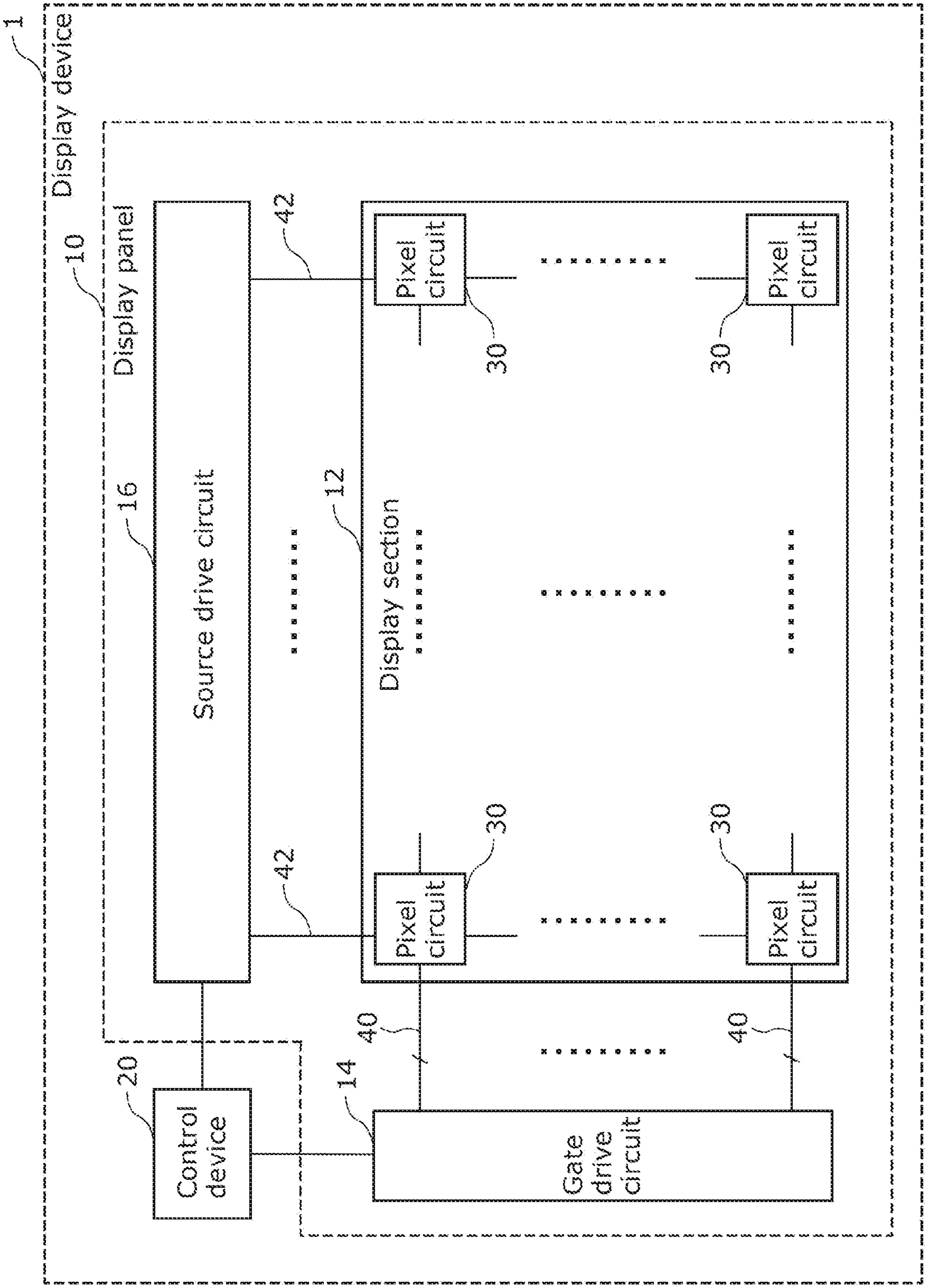
FIG. 1 is a schematic diagram illustrating an example of a configuration of a display device according to Embodiment 1.

A configuration of the display device according to the present embodiment is described with reference to FIG. 1. FIG. 1 is a schematic diagram illustrating an example of a configuration of display device 1 according to the present embodiment. As illustrated in FIG. 1, display device 1 includes display panel 10 and control device 20.

[1-2. Configuration of Display Panel]

As illustrated in FIG. 1, display panel 10 includes display section 12 that includes a plurality of pixel circuits 30. Moreover, display panel 10 includes gate drive circuit 14 and source drive circuit 16, as peripheral circuits of display section 12. Note that display section 12, gate drive circuit 14, source drive circuit 16, scanning line 40, and signal line 42 are implemented on a panel substrate (not shown) that is made of glass or resin, such as acrylic, for example.

Display section 12 displays video based on a video signal externally inputted into display panel 10. As illustrated in FIG. 1, display panel 12 includes the plurality of pixel circuits 30 arranged in a matrix. Furthermore, display panel 12 includes scanning lines 40 in rows (extending in the horizontal direction in FIG. 1) and signal lines 42 in columns (extending in the vertical direction in FIG. 1). In display panel 12, an initialization operation, a writing operation, and an emission operation are performed for each of the rows of the plurality of pixel circuits 30 sequentially.

The plurality of pixel circuits 30 are arranged in a matrix in display panel 10. To be more specific, each of the plurality of pixel circuits 30 is disposed at an intersection of scanning line 40 and signal line 42. A configuration of pixel circuit 30 is described in detail later.

Scanning line 40 is disposed for each of the rows of the plurality of pixel circuits 30. One end of scanning line 40 is connected to pixel circuit 30, and the other end of scanning line 40 is connected to gate drive circuit 14.

Signal line 42 is disposed for each of the columns of the plurality of pixel circuits 30. One end of signal line 42 is connected to pixel circuit 30, and the other end of signal line 42 is connected to source drive circuit 16.

Gate drive circuit 14 is also referred to as a scanning line drive circuit, and is implemented by a shift register, for example. Gate drive circuit 14 is connected to scanning line 40. Gate drive circuit 14 performs on-off control on a transistor included in pixel circuit 30, by outputting a gate control signal to scanning line 40. For example, gate drive circuit 14 according to the present embodiment outputs, to a gate of the transistor included in pixel circuit 30, control signal WS, control signal REF, control signal INI, and control signal ENB as gate control signals for the on-off control over the transistor.

Source drive circuit 16 is also referred to as a signal line drive circuit. Source drive circuit 16 is connected to signal line 42. Source drive circuit 16 outputs, to signal line 42, a signal corresponding to a video signal supplied for each frame by control device 20, and thereby supplies this video signal to pixel circuit 30. Source drive circuit 16 writes, into pixel circuit 30, brightness information based on the video signal as a current value or as a voltage value. Note that the video signal inputted to source drive circuit 16 is digital serial data for each of three primary colors, red (R), green (G), and blue (B) (that is, video signals R, G, and B). Video signals R, G, and B inputted to source drive circuit 16 are converted into parallel data for each row in source drive circuit 16. Furthermore, the parallel data for each row is converted into analog data for each row in source drive circuit 16. Then, the analog data is outputted as a video signal to signal line 42. Note that although the plurality of pixel circuits 30 include pixel circuit 30 that supports the RGB primary colors in the above description, the configuration of the plurality of pixel circuits 30 is not limited to this. For example, the plurality of pixel circuits 30 may include pixel circuit 30 that supports R, G, B, and white (W).

[1-3. Configuration of Pixel Circuit]

Figure 2:
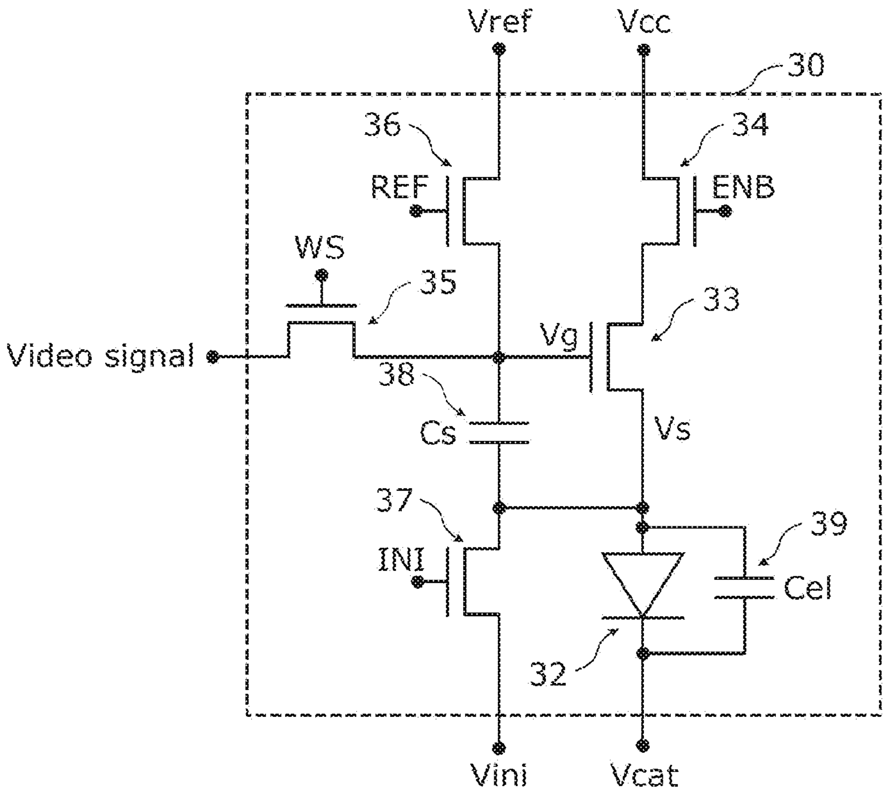
FIG. 2 is a schematic circuit diagram illustrating a configuration of a pixel circuit according to Embodiment 1.

A configuration of pixel circuit 30 is described with reference to FIG. 2. FIG. 2 is a schematic circuit diagram illustrating the configuration of pixel circuit 30 according to the present embodiment.

The plurality of pixel circuits 30 are arranged in a matrix with N rows and M columns. Here, “N” and “M” depend on size and resolution of a display screen. For example, to achieve a resolution regarded as high definition (HD) by pixel circuits 30 adjacent to each other in a row and supporting the RGB primary colors, the number of N is at least 1080 and the number of M is at least 1920×3 columns. In the present embodiment, pixel circuit 30 includes light emitting element 32 as an organic EL element.

As illustrated in FIG. 2, pixel circuit 30 includes light emitting element 32, drive transistor 33, selection transistor 35, switch transistors 34, 36, and 37, and pixel capacitance 38. Note that pixel capacitance 38 is also indicated as “Cs” in FIG. 2.

Light emitting element 32 includes a cathode and an anode. The cathode is connected to a cathode power line that is maintained at anode potential Vcat. The anode is connected to a source of drive transistor 33. Light emitting element 32 is applied with a current supplied from drive transistor 33 corresponding to a signal voltage of a video signal, and thereby emits light with brightness corresponding to this signal voltage. For example, light emitting element 32 is an organic El element. Note that light emitting element 32 is not limited to an organic EL element, and may be a self-luminous element, such as an inorganic EL element or a quantum dot light-emitting diode (QLED). Alternatively, if controllable by current drive, light emitting element 32 need not be a self-luminous element.

Drive transistor 33 includes a gate, the source, and a drain. The gate of drive transistor 33 is connected to, for example, either one of electrodes of pixel capacitance 38. The drain of drive transistor 33 is connected to a source of switch transistor 34. The source of drive transistor 33 is connected to the anode of light emitting element 32, and also to, for example, the other one of the electrodes of pixel capacitance 38. Drive transistor 33 converts a signal voltage applied between the gate and the source (this voltage is referred to as a gate-source voltage) into a current corresponding to the signal voltage (this current is referred to as a drain-source current). As a result, drive transistor 33 is turned on and thus supplies light emitting element 32 with the drain-source current to cause light emitting element 32 to emit light. For example, drive transistor 33 is implemented by an n-type thin-film transistor (n-type TFT).

Switch transistor 34 includes a gate that is connected to scanning line 40. Either one of the source and a drain of switch transistor 34 is connected to a drive power source that supplies drive potential Vcc. The other one of the source and the drain of switch transistor 34 is connected to the drain of drive transistor 33. In response to control signal ENB supplied from scanning line 40, switch transistor 34 is turned on or off. Upon being turned on, switch transistor 34 connects drive transistor 33 to the drive power source. As a result, the drain-source current of drive transistor 33 is supplied to light emitting element 32. For example, switch transistor 34 is implemented by an n-type TFT.

Selection transistor 35 includes a gate that is connected to scanning line 40. Either one of a source and a drain of selection transistor 35 is connected to signal line 42. The other one of the source and the drain of selection transistor 35 is connected to either one of the electrodes of pixel capacitance 38. In response to control signal WS supplied from scanning line 40, selection transistor 35 is turned on or off. Upon being turned on, selection transistor 35 applies a signal voltage of a video signal supplied from signal line 42 to the electrode of pixel capacitance 38. As a result, electric charge corresponding to the signal voltage is accumulated in pixel capacitance 38. For example, selection transistor 35 is implemented by an n-type TFT.

Switch transistor 36 includes a gate that is connected to scanning line 40. Either one of a source and a drain of switch transistor 36 is connected to a reference power source that supplies reference potential Vref. The other one of the source and the drain of switch transistor 36 is connected to, for example, one of the electrodes of pixel capacitance 38. In response to control signal REF supplied from scanning line 40, switch transistor 36 is turned on or off. Upon being turned on, switch transistor 36 sets the electrode of pixel capacitance 38 at reference potential Vref. For example, selection transistor 36 is implemented by an n-type TFT.

Switch transistor 37 includes a gate that is connected to scanning line 40. Either one of a source and a drain of switch transistor 37 is connected to the source of drive transistor 33 and to the other one of the electrodes of pixel capacitance 38. The other one of the source and the drain of switch transistor 37 is connected to an initialization power source that supplies initialization potential Vini. In response to control signal INI supplied from scanning line switch transistor 37 is turned on or off. Upon being turned on, switch transistor 37 sets the potential of the anode of light emitting element 32 at initialization potential Vini. For example, selection transistor 37 is implemented by an n-type TFT.

Pixel capacitance 38 is a capacitance to be applied with a video signal. One end of pixel capacitance 38 is connected to the gate of drive transistor 33, and the other end of pixel capacitance 38 is connected to the source of drive transistor 33. The one end of pixel capacitance 38 is also connected to the source of selection transistor and to the source of switch transistor 36. Pixel capacitance 38 accumulates electric charge corresponding to a video signal supplied from signal line 42. For example, after selection transistor 35 and switch transistor 36 are off, pixel capacitance 38 stably maintains the gate-source voltage of drive transistor 33. In this way, when selection transistor 35 and switch transistor 36 are off, pixel capacitance 38 applies a voltage between the gate and the source of drive transistor 33, according to a voltage corresponding to the accumulated electric charge.

EL capacitance 39 corresponds to a parasitic capacity inherent in light emitting element 32 that is an EL element. After the voltage between the electrodes rises as a result of the charging of this capacity, current starts flowing into light emitting element 32. Then, light emitting element 32 starts emitting light. Note that EL capacitance 39 is also indicated as "Cel".

Note that each of the conductivity types of drive transistor 33, selection transistor 35, switch transistor 36, and switch transistor 37 is not limited to the type described above. These transistors may include both n-type TFTs and p-type TFTs as appropriate. Furthermore, each of these transistors need not be implemented by a polysilicon TFT, and may be implemented by an amorphous silicon TFT or an oxide semiconductor TFT for example.

[1-4. Control Method]

The control method of display device 1 according to the present embodiment and advantageous effects achieved by this control method are described. The following describes the control method of display device 1 according to the present embodiment, by comparison with a control method of a display device according to a comparison example.

[1-4-1. Control Method of Display Device According to Comparison Example]

First, the control method of the display device according to the comparison example is described. The display device according to the comparison example is identical to display device 1 according to Embodiment 1, except for the control method. To be more specific, the display device according to the comparison example is identical to display device 1 according to Embodiment 1 except for the configuration of a control device.

Figure 3:
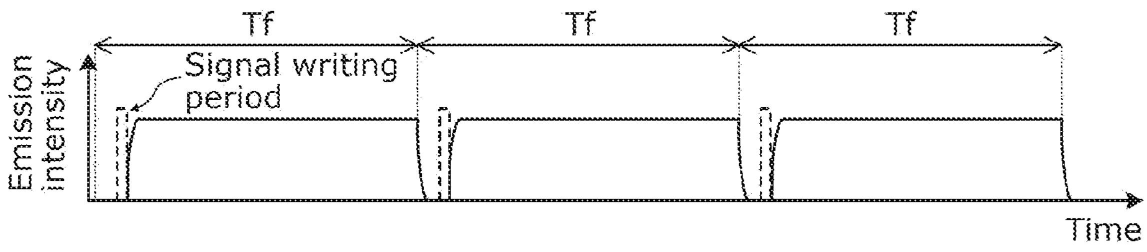
FIG. 3 is a schematic diagram illustrating a waveform of light emitted by a light emitting element included in a display device according to a comparison example.
Figure 4:
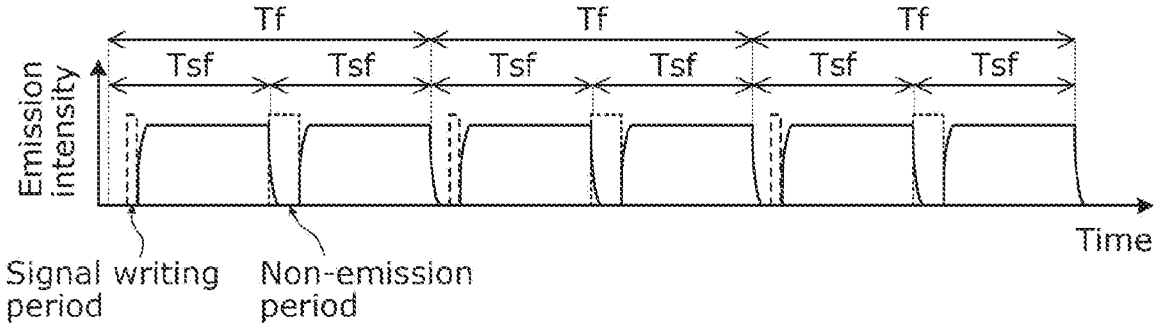
FIG. 4 is a first schematic diagram illustrating a waveform of light emitted by the light emitting element included in the display device after insertion of non-emission periods, according to the comparison example.
Figure 5:
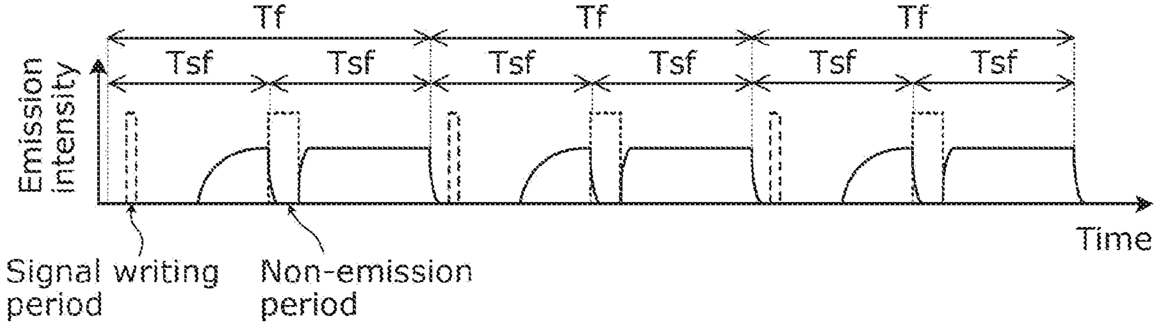
FIG. 5 is a second schematic diagram illustrating a waveform of light emitted by the light emitting element included in the display device after insertion of non-emission periods, according to the comparison example.

A waveform of light emitted by the display device according to the comparison example is described with reference to FIG. 3 to FIG. FIG. 3 is a schematic diagram illustrating a waveform of light emitted by a light emitting element included in the display device according to the comparison example. Each of FIG. 4 and FIG. 5 is a schematic diagram illustrating a waveform of light emitted by the light emitting element included in the display device after insertion of non-emission periods, according to the comparison example. FIG. 4 illustrates the waveform of light for an HDR video signal. FIG. 5 illustrates the waveform of light for an LDR video signal. Furthermore, each of FIG. 3 to FIG. 5 also illustrates a signal writing period (indicated by the broken line) and a non-emission period (indicated by the dotted line).

Figure 6:
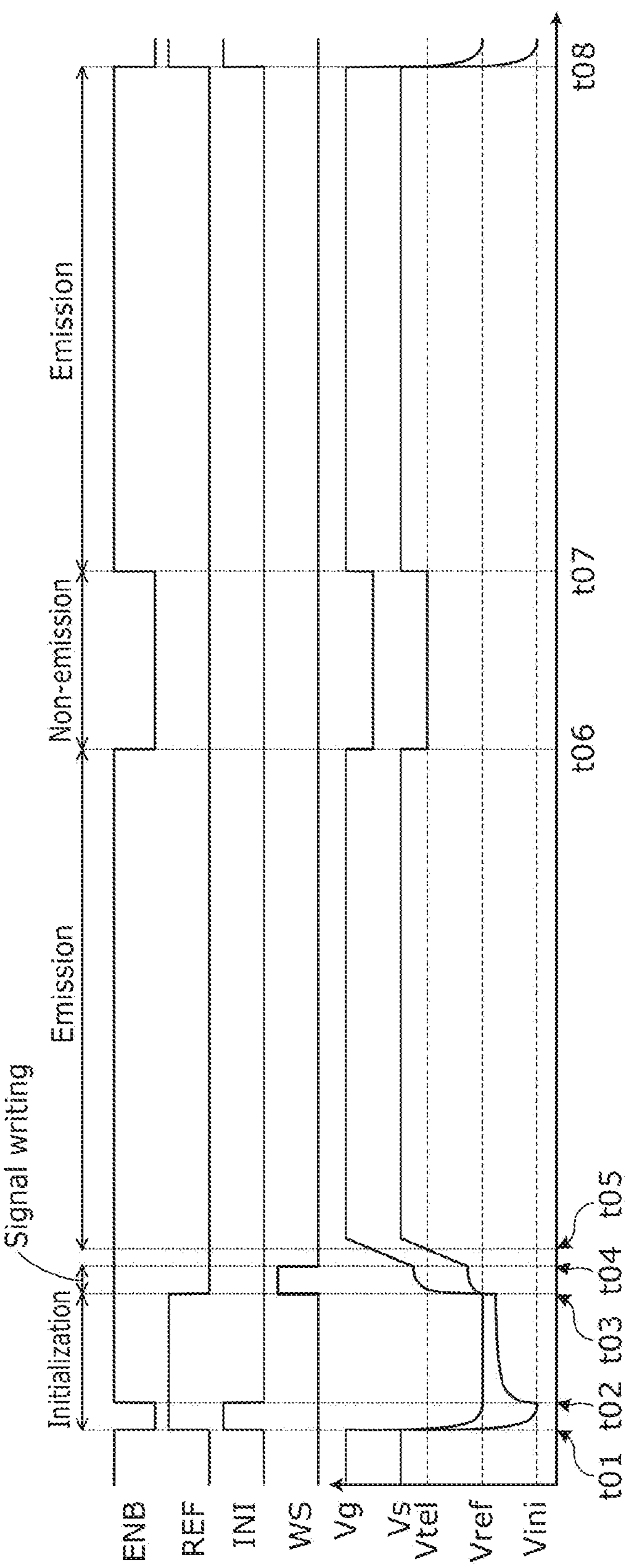
FIG. 6 is a diagram illustrating in detail an operation performed for a high dynamic range (HDR) video signal by a pixel circuit included in the display device according to the comparison example.
Figure 7:
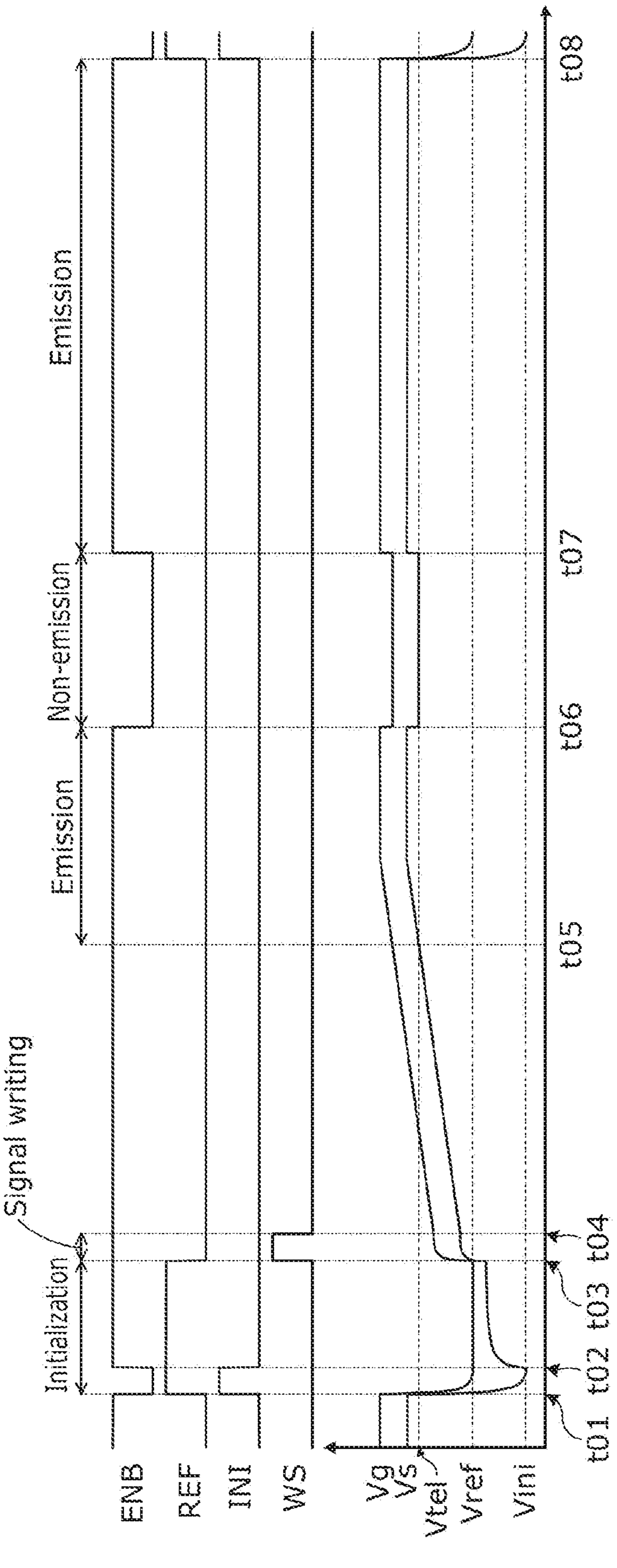
FIG. 7 is a diagram illustrating in detail an operation performed for a low dynamic range (LDR) video signal by the pixel circuit included in the display device according to the comparison example.

As illustrated in FIG. 3, the light emitting element repeats a frame period (Tf) that includes a non-emission period and an emission period. Thus, a long frame period, or more specifically, a low-frequency frame, results in visible flicker. For example, at a frame frequency of 60 Hz or lower, visible flicker occurs. As a measure to prevent this for a low frame frequency, a non-emission period is inserted into the emission period as illustrated in FIG. 4 and FIG. 5. As illustrated in FIG. 4, this measure reduces an emission cycle (also referred to as subframe period Tsf) for an HDR video signal and thus prevents flicker. However, for an LDR video signal, the non-emission period from the end of a signal writing period to the start of emission increases, as illustrated in FIG. 5. Due to this non-emission period that occurs every frame period Tf, flicker cannot be fully prevented. An operation performed by this display device according to the comparison example is described in detail with reference to FIG. 6 and FIG. 7. FIG. 6 is a diagram illustrating in detail an operation performed for an HDR video signal by a pixel circuit included in the display device according to the comparison example. FIG. 7 is a diagram illustrating in detail an operation performed for an LDR video signal by the pixel circuit included in the display device according to the comparison example.

As illustrated in FIG. 6 and FIG. 7, an initialization operation is performed from time t01. To be more specific, by controlling gate drive circuit 14 at time t01, control device 20 sets control signal ENB at Low level, control signal REF at High level, control signal INI at High level, and control signal WS at Low level. As a result, switch transistor 34 is off, switch transistor 36 is on, switch transistor 37 is on, and selection transistor 35 is off. Hereafter, when control device controls the control signals by controlling gate drive circuit 14 or source drive circuit 16, this is also phrased simply as "control device controls the control signals".

Following this, gate potential Vg of drive transistor 33 changes to reference potential Vref, and source potential Vs of drive transistor 33 changes to initialization potential Vini. Source potential Vs corresponds to the anode potential of light emitting element 32, and the anode potential becomes less than emission threshold voltage Vtel. As a result, light emitting element 32 is maintained in a non-emission state.

After this, control device 20 switches control signal ENB to High level and control signal INI to Low level, at time t02. As a result, switch transistor 34 is switched on, and switch transistor 37 is switched off. Following this, drive potential Vcc is applied to the drain of drive transistor 33. At this time, gate potential Vg of drive transistor 33 is maintained at reference potential Vref, and the gate-source voltage converges to a voltage corresponding to a threshold voltage of drive transistor 33. This state is maintained until time t03 that follows. A period from time t01 to time t03 is an initialization period (or a first initialization period).

After this, control signal REF is switched to Low level, and control signal WS is switched to High level, at time t03. As a result, switch transistor 36 is switched off, and selection transistor 35 is switched on. With this, a voltage corresponding to the video signal is applied to pixel capacitance 38 (or more specifically, the gate of drive transistor 33) via scanning line 42. In this way, the video signal is written into pixel capacitance 38 of pixel circuit 30.

As a result of the application of the voltage corresponding to the video signal to pixel capacitance 38, gate potential Vg rises in response to this voltage. Following this, source potential Vs also rises, and the voltage across pixel capacitance 38 reaches a voltage corresponding to the video signal. This state is maintained until time t04 that follows. A period from time t03 to time t04 is a signal writing period.

After this, control signal WS is switched to Low level at time 04. As a result, selection transistor 35 is switched off. Following this, a current corresponding to the gate-source voltage passes through drive transistor 33. Here, EL capacitance 39 of light emitting element 32 is first charged by drive transistor 33. Next, a bootstrapping operation is performed to raise the anode potential of light emitting element 32, that is, source potential Vs of drive transistor 33. Then, at time t05, source potential Vs of drive transistor 33 reaches emission threshold voltage Vtel of light emitting element 32 or higher, thereby causing light emitting element 32 to start emission.

By this bootstrapping operation, a rise rate of source potential Vs (that is, a slope of a curve indicating source potential Vs in each of FIG. 6 and FIG. 7) increases with increase of the gate-source voltage, that is, with increase in dynamic range of the video signal.

Thus, source potential Vs for the HDR video signal rapidly rises to emission threshold voltage Vtel. Thus, a period from the end of the signal writing period (time t04) to the start of the emission (time t05) is short, as illustrated in FIG. 6.

In contrast, time taken for source potential Vs for the LDR video signal to rise to emission threshold voltage Vtel is longer than the time taken for source potential Vs for the HDR video signal, as illustrated in FIG. 7. In other words, the period from the end of the signal writing period (time t04) to the start of the emission (time t05) is longer.

After this, control signal ENB is switched to Low level at time t06, as illustrated in FIG. 6 and FIG. 7. As a result, switch transistor 34 is turned off, and the current supply from drive transistor 33 to light emitting element 32 is thereby stopped. Following this, light emitting element 32 is maintained in the non-emission state. This state is maintained until time t07 that follows. A period from time t06 to time t07 is a non-emission period.

After this, control signal ENB is switched back to High level at time t07. As a result, the current supply to light emitting element 32 is resumed, and the emission is thereby resumed by light emitting element 32. Here, a period from time t07 to the start of the emission by light emitting element 32 is independent of the dynamic range level of the video signal. The emission by light emitting element 32 starts immediately after time t07.

After this, the initialization operation is performed at time t08 as performed at time t01.

As described above, for the HDR video signal, the control method of the display device according to the comparison example causes the non-emission period from time t01 to time t05 to be substantially equal in length to the non-emission period from time t06 to time t07, as illustrated in FIG. 6. For the LDR video signal in this case, the control method causes the non-emission period from time t01 to time t05 to be significantly longer than the non-emission period from time t06 to time t07, as illustrated in FIG. 7. More specifically, the long non-emission period from time t01 to time t05 occurs every frame period for the LDR video signal. Thus, this control method fails to prevent flicker.

[1-4-2. Control Method of Display Device According to Present Embodiment]

Figure 8:
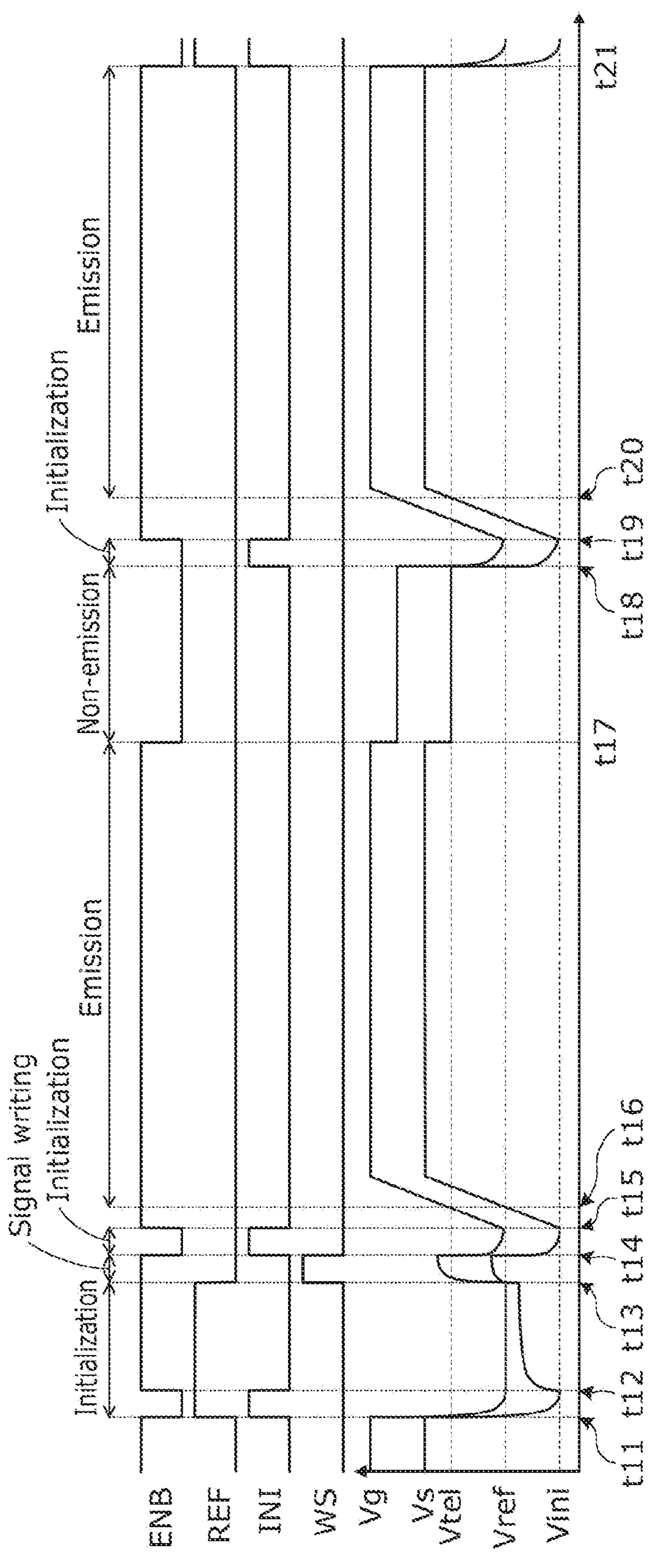
FIG. 8 is a diagram illustrating in detail an operation performed for an HDR video signal by the pixel circuit included in the display device according to Embodiment 1.
Figure 9:
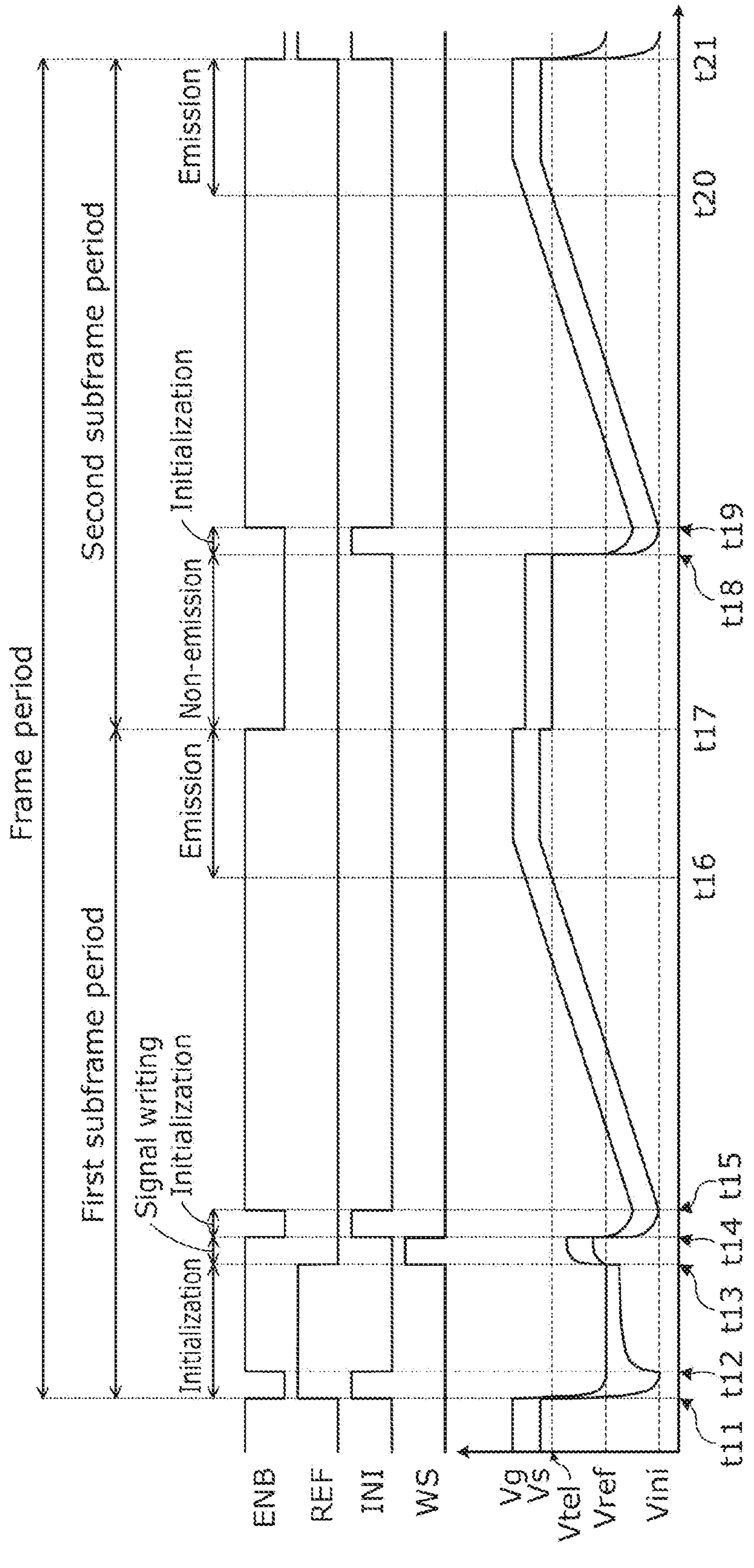
FIG. 9 is a diagram illustrating in detail an operation performed for an LDR video signal by the pixel circuit included in the display device according to Embodiment 1.

The control method of display device 1 according to the present embodiment is described with reference to FIG. 8 and FIG. 9. FIG. 8 is a diagram illustrating in detail an operation performed for an HDR video signal by pixel circuit 30 included in display device 1 according to the present embodiment. FIG. 9 is a diagram illustrating in detail an operation performed for an LDR video signal by pixel circuit 30 included in display device 1 according to the present embodiment.

By the control method of display device 1 according to the present embodiment as illustrated in FIG. 8 and FIG. 9, a frame period during which one image continues to be displayed includes a first subframe period and at least one second subframe period that follows the first subframe period. In examples illustrated in FIG. 8 and FIG. 9, the frame period includes a single second subframe period. In FIG. 8 and FIG. 9, the first subframe period is from time t11 to time t17 and the second subframe period is from time t17 to time t21.

In the examples illustrated in FIG. 8 and FIG. 9, control device sets control signal ENB at Low level, control signal REF at High level, and control signal WS at Low level, at time t11, as in the comparison example. As a result, the maintained on-state of switch transistor 34 allows the source of drive transistor 33 to be applied with initialization potential Vini as a first initialization potential (this process is referred to as the first initialization step or step (A)). Furthermore, the maintained on-state of switch transistor 36 allows the gate of drive transistor 33 to be applied with reference potential Vref.

After this, control device 20 switches control signal ENB to High level and control signal INI to Low level at time t12, as in the comparison example. As a result, the gate-source voltage of drive transistor 33 converges to a voltage corresponding to the threshold voltage of drive transistor 33, as with the control method of the display device according to the comparison example.

After this, control device 20 switches control signal REF to Low level and control signal WS to High level, at time t13, as in the comparison example. As a result, the video signal corresponding to the image in the present frame period is applied to pixel capacitance 38 (this process is referred to as the writing step or step (B)), as in the comparison example.

After this, control device 20 switches control signal ENB to Low level and control signal INI to High level, at time t14. As a result, the source of drive transistor 33 is applied with initialization potential Vini as a second initialization potential (this process is referred to as the third initialization step or step (G)). Then, as illustrated in FIG. 8 and FIG. 9, source potential Vs reaches initialization potential Vini, and gate potential Vg varies according to source potential Vs while keeping the gate-source voltage constant.

After this, control device 20 switches control signal ENB to High level and control signal INI to Low level, at time t15. Following this, a current corresponding to the gate-source voltage passes through drive transistor 33. Thus, source potential Vs rises as a result of the bootstrapping operation, as in the comparison example. Then, source potential Vs reaches emission threshold voltage Vtel of light emitting element 32 or higher, thereby causing light emitting element 32 to start emission at time t16 (this process is referred to as the first emission step or step (C)). This emission continues until time t17 at which the first subframe period ends.

After this, control signal ENB is switched to Low level at time t17 at which the second subframe period starts. As a result, switch transistor 34 is off, and the current supply from drive transistor 33 to light emitting element 32 is thereby stopped. Following this, light emitting element 32 is maintained in the non-emission state (this process is referred to as the non-emission step or step (D)).

After this, control device 20 switches control signal ENB to Low level and control signal INI to High level at time t18, as at time t14. As a result, the source of drive transistor 33 is applied with initialization potential Vini as the second initialization potential (this process is referred to as the second initialization step or step (E)). Then, as illustrated in FIG. 8 and FIG. 9, source potential Vs reaches initialization potential Vini, and gate potential Vg varies according to source potential Vs while keeping the gate-source voltage constant. Note that this state is maintained until time t19 and that the non-emission state of light emitting element 32 is thus maintained at least until time t19. In the present embodiment, a period from time t17 to t19 corresponds to the non-emission step. Furthermore, the second initialization step is executed at the end of the non-emission step.

After this, control device 20 switches control signal ENB to High level and control signal INI to Low level at time t19, as at time t15. Following this, a current corresponding to the gate-source voltage passes through drive transistor 33. Thus, source potential Vs rises as a result of the bootstrapping operation. Then, source potential Vs reaches emission threshold voltage Vtel of light emitting element 32 or higher, thereby causing light emitting element 32 to start emission at time t20 (this process is referred to as the second emission step or step (F)). This emission continues until time t21 at which the second subframe period ends.

As described above, the control method of display device 1 according to the present embodiment includes, in the first subframe period: (A) applying a first initialization potential, which is predetermined, to the source of drive transistor 33; (B) writing a signal corresponding to the one image into pixel capacitance 38 after step (A); and (C) causing light emitting element 32 to emit light after step (B). The control method of display device 1 according to the present embodiment includes, in each of the at least one second subframe period: (D) maintaining light emitting element 32 in a non-emission state; (E) applying a second initialization potential, which is predetermined, to the source of drive transistor 33 in step (D); and (F) causing light emitting element 32 to emit light after step (D).

In this way, the initialization operation is also performed in the second subframe period, and thus the bootstrapping operation is also performed in the second subframe period. With this, as illustrated in FIG. 8 and FIG. 9, differences in length of the emission period and in length of the non-emission period between the first subframe period and the second subframe period can be reduced even for an LDR video signal, as compared with the comparison example. Hence, flicker can be prevented in the present embodiment as compared with the comparison example.

Furthermore, the control method of display device 1 according to the present embodiment further includes, in the first subframe period, (G) applying the second initialization potential to the source of drive transistor 33 after step (B) but before step (C) (see the period from time t14 to time t15 in FIG. 8 and FIG. 9).

With this, the period from the end of the third initialization step (time t15 in FIG. 8 and FIG. 9) to the start of the first emission step (time t16 in FIG. 8 and FIG. 9) in the first subframe period is equal in length to the period from the end of the second initialization step (time t19 in FIG. 8 and FIG. 9) to the start of the second emission step (time t20) in the second subframe period. With this, differences in length of the emission period and in length of the non-emission period between the first subframe period and the second subframe period can be further reduced. Hence, flicker can be further prevented.

Furthermore, by the control method of display device 1 according to the present embodiment, step (E) is executed at the end of step (D) in the second subframe period.

With this, the bootstrapping operation is started immediately after the second initialization step in the second subframe period. Furthermore, the bootstrapping operation is also started immediately after the third initialization step in the first subframe period. This allows the operation in the second subframe period to be more similar in aspect to the operation in the first subframe period. Thus, differences in length of the emission period and in length of the non-emission period between the first subframe period and the second subframe period can be further reduced. Hence, flicker can be further prevented.

Note that the second initialization step may be executed at any time in the non-emission step other than at the end. To be more specific, the second initialization step may be executed at any time in the period from time t17 to time t19 illustrated in FIG. 8 and FIG. 9.

In the present embodiment, the first subframe period is equal in length to the second subframe period.

Thus, the first subframe period and the second subframe period having the same length allow the emission periods in these subframe periods to be equal in length and the non-emission periods in these subframe periods to be equal in length. Hence, flicker can be further prevented.

Furthermore, the control method of display device 1 according to the present embodiment is implemented by control device 20. In the first subframe period, the control device: applies a first initialization potential, which is predetermined, to the source of drive transistor 33; and causes light emitting element 32 to emit light, by applying a signal corresponding to the one image to pixel capacitance 38. In each of the at least one second subframe period, control device 20: maintains light emitting element 32 in a non-emission state; applies a second initialization potential, which is predetermined, to the source of drive transistor 33 when the light emitting element is in the non-emission state; and switches light emitting element 32 from the non-emission state to an emission state.

Furthermore, in the first subframe period, control device 20 applies the second initialization potential to the source of drive transistor 33, after applying the signal corresponding to the one image to pixel capacitance 38 but before causing light emitting element 32 to emit light.

With this, the period from the end of the application of the second initialization potential (time t15 in FIG. 8 and FIG. 9) to the start of the emission (time t16 in FIG. 8 and FIG. 9) in the first subframe period is equal in length to the period from the end of the application of the second initialization potential (time t19 in FIG. 8 and FIG. 9) to the start of the emission (time t20) in the second subframe period. With this, differences in length of the emission period and in length of the non-emission period between the first subframe period and the second subframe period can be further reduced. Hence, flicker can be further prevented.

[1-5. Vrr Mode]

Display device 1 and the control method of display device 1 according to the present embodiment are also applicable in a variable refresh rate (VRR) mode. The following describes advantageous effects achieved by display device 1 and the control method of display device 1 according to the present embodiment in the VRR mode, with reference to FIG. 10 to FIG. 12.

Figure 10:
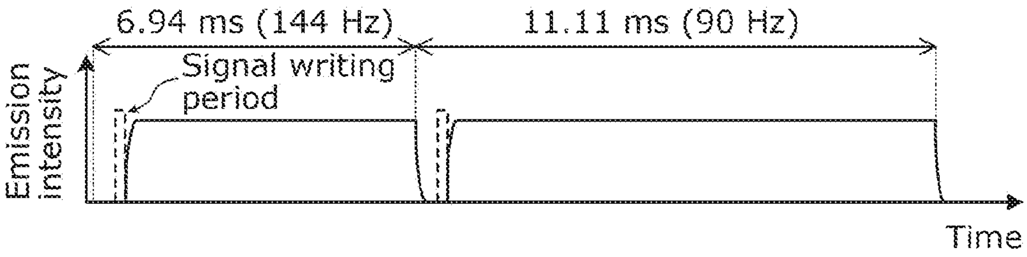
FIG. 10 is a schematic diagram illustrating a waveform of light emitted by a light emitting element in a variable refresh rate (VRR) mode.
Figure 11:
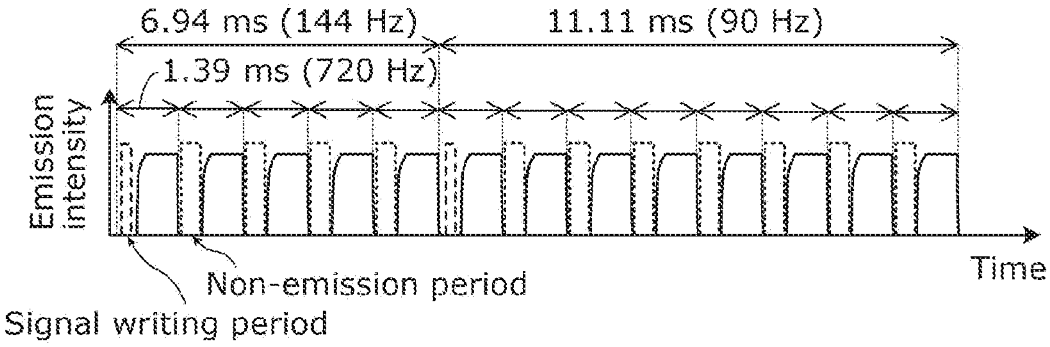
FIG. 11 is a schematic diagram illustrating a waveform of light emitted for an LDR video signal by the light emitting element of the display device in the VRR mode, according to Embodiment 1.
Figure 12:
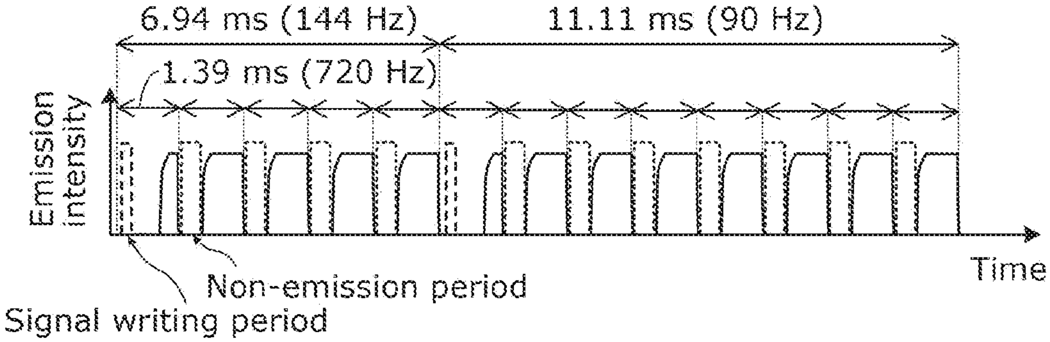
FIG. 12 is a schematic diagram illustrating a waveform of light emitted for an LDR video signal by a light emitting element of a display device in the VRR mode, according to a comparison example.

First, the VRR mode is described with reference to FIG. 10. FIG. 10 is a schematic diagram illustrating a waveform of light emitted by the light emitting element in the VRR mode. FIG. 11 is a schematic diagram illustrating a waveform of light emitted for an LDR video signal by the light emitting element of display device 1 in the VRR mode, according to Embodiment 1. FIG. 12 is a schematic diagram illustrating a waveform of light emitted for an LDR video signal by a light emitting element of a display device in the VRR mode, according to a comparison example. Furthermore, each of FIG. 10 to FIG. 12 also illustrates a signal writing period (indicated by the broken line) and a non-emission period (indicated by the dotted line).

In the VRR mode, a refresh rate varies according to video to be displayed, as illustrated in FIG. 10. In the example illustrated in FIG. 10, the refresh rate changes from 144 Hz to 90 Hz. Even in this VRR mode, visible flicker occurs at a low refresh rate. To prevent this flicker, display device 1 and the control method of display device 1 according to the present embodiment are also applicable. With reference to FIG. 11 and FIG. 12, the following describes an example of application of display device 1 according to the present embodiment in the VRR mode, by comparison with the comparison example.

As illustrated in FIG. 11, a frame period corresponding to the refresh rate in the VRR mode includes a first subframe period and at least one second subframe period. In the example illustrated in FIG. 11, the frame period includes the first subframe period and the second subframe period each having 1.39-ms (corresponding to 720 Hz).

A frame period of the display device according to the comparison example also includes a first subframe period and a second subframe period. However, the emission period in the first subframe period is shorter than the emission period in the second subframe period for the LDR video signal due to the bootstrapping operation performed in the display device according to the comparison example, as described above. For this reason, flicker cannot be prevented.

In contrast, display device 1 according to the present embodiment can reduce the difference in length of the emission period between the first subframe period and the second subframe period, as described above. Hence, flicker can be prevented in the present embodiment.

Figure 13:
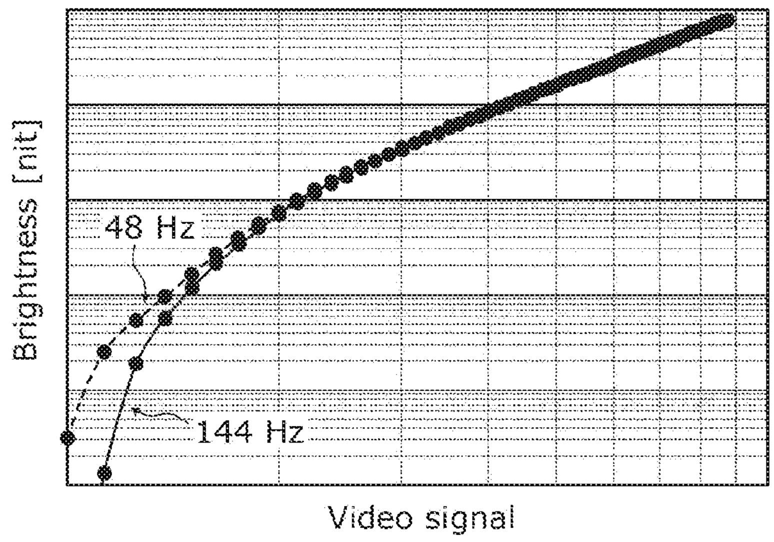
FIG. 13 is a graph illustrating a relationship between video signal and brightness of the display device according to the comparison example.
Figure 14:
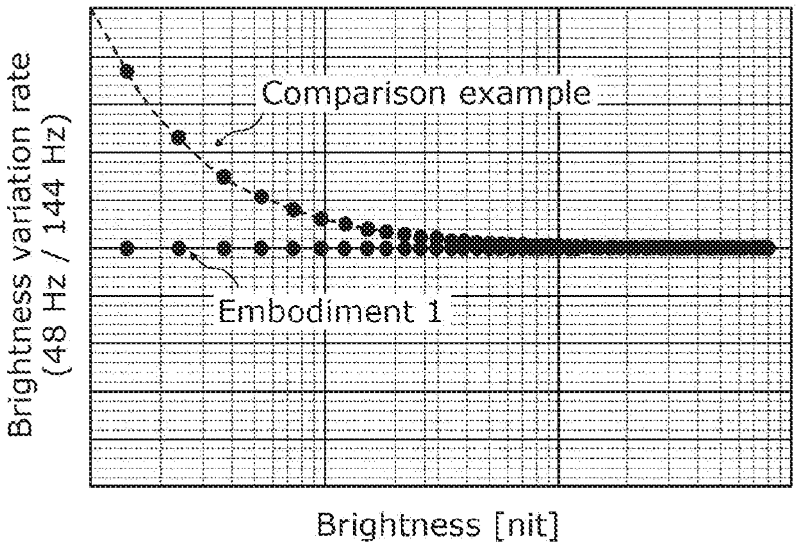
FIG. 14 is a graph illustrating a relationship between brightness and brightness variation rate, for each of the display device according to Embodiment 1 and the display device according to the comparison example.

Furthermore, as illustrated in FIG. 12, a proportion of the first subframe period having a short emission period in one frame cycle varies according to the refresh rate. This results in brightness variation according to the refresh rate even for the same video signal. More specifically, a gamma shift is caused according to the refresh rate. This gamma shift is described with reference to FIG. 13 and FIG. 14. FIG. 13 is a graph illustrating a relationship between video signal and brightness of the display device according to the comparison example. FIG. 13 illustrates a graph for the refresh rate of 144 Hz (indicated by the solid line) and for the refresh rate of 48 Hz (indicated by the broken line). FIG. 14 is a graph illustrating a relationship between brightness and brightness variation rate, for each of display device 1 according to the present embodiment and the display device according to the comparison example. FIG. 14 illustrates the brightness variation rate between the refresh rate of 144 Hz and the refresh rate of 48 Hz. Furthermore, the relationship related to display device 1 according to the present embodiment is indicated by the solid line, and the relationship related to the display device according to the comparison example is indicated by the broken line.

As illustrated in FIG. 13, the display device according to the comparison example causes brightness at the refresh rate of 144 Hz to be lower than the brightness at the refresh rate of 48 Hz in a region for the LDR video signal. More specifically, as indicated by the broken line in FIG. 14, the display device according to comparison example causes the brightness variation according to the refresh rate to increase with decrease in brightness. In contrast, as indicated by the solid line in FIG. 14, display device 1 according to the present embodiment causes no brightness variation (no gamma shift) even if the refresh rate changes.

As described above, display device 1 and the control method of display device 1 according to the present embodiment is applicable in the VRR mode. Thus, effects of preventing flicker and gamma shift can be achieved.

Embodiment 2

A display device and a control method of the display device according to Embodiment 2 are described. The display device according to the present embodiment is different from the display device according to Embodiment 1 mainly in the first initialization potential and the second initialization potential. The following mainly describes differences between: the display device and the control method of the display device according to the present embodiment; and those according to Embodiment 1.

[2-1. Configuration of Pixel Circuit]

Figure 15:
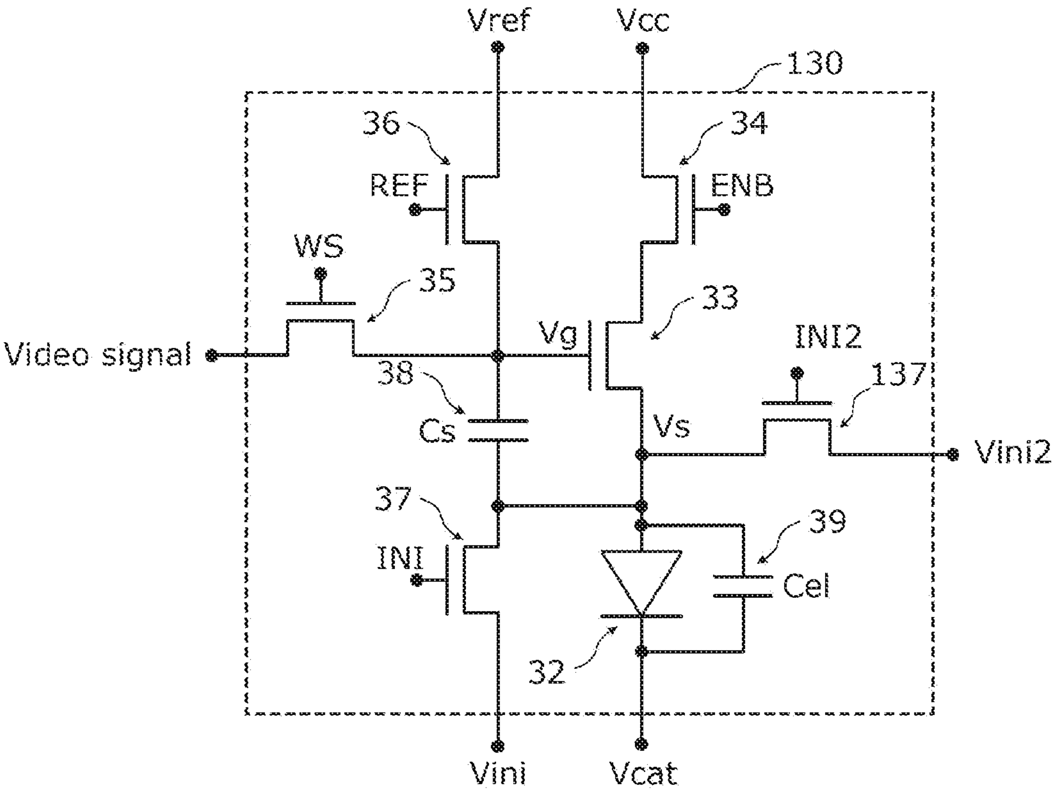
FIG. 15 is a schematic circuit diagram illustrating a configuration of a pixel circuit according to Embodiment 2.

A configuration of a pixel circuit included in the display device according to the present embodiment is described with reference to FIG. 15. FIG. 15 is a schematic circuit diagram illustrating a configuration of pixel circuit 130 according to the present embodiment. The display device according to the present embodiment includes pixel circuit 130 as illustrated in FIG. 15.

Pixel circuit 130 further includes switch transistor 137 in addition to the configuration of pixel circuit 30 according to Embodiment 1.

Switch transistor 137 includes a gate that is connected to scanning line 40. Either one of a source and a drain of switch transistor 137 is connected to a source of drive transistor 33 and to the other one of electrodes of pixel capacitance 38. The other one of the source and the drain of switch transistor 137 is connected to a second initialization power source that supplies second initialization potential Vini2. Anode potential Vcat or reference potential Vref may be used as second initialization potential Vini2. Alternatively, a voltage supplied from a power source that is separately added may be used.

As in Embodiment 1, gate drive circuit 14 according to the present embodiment outputs gate control signals to a gate of a transistor included in pixel circuit 130. The gate control signals are used for the on-off control over the transistor, and include control signal WS, control signal REF, control signal INI, and control signal ENB. In the present embodiment, gate drive circuit 14 further outputs control signal INI2 to the gate of switch transistor 137.

[2-2. Control Method]

Figure 16:
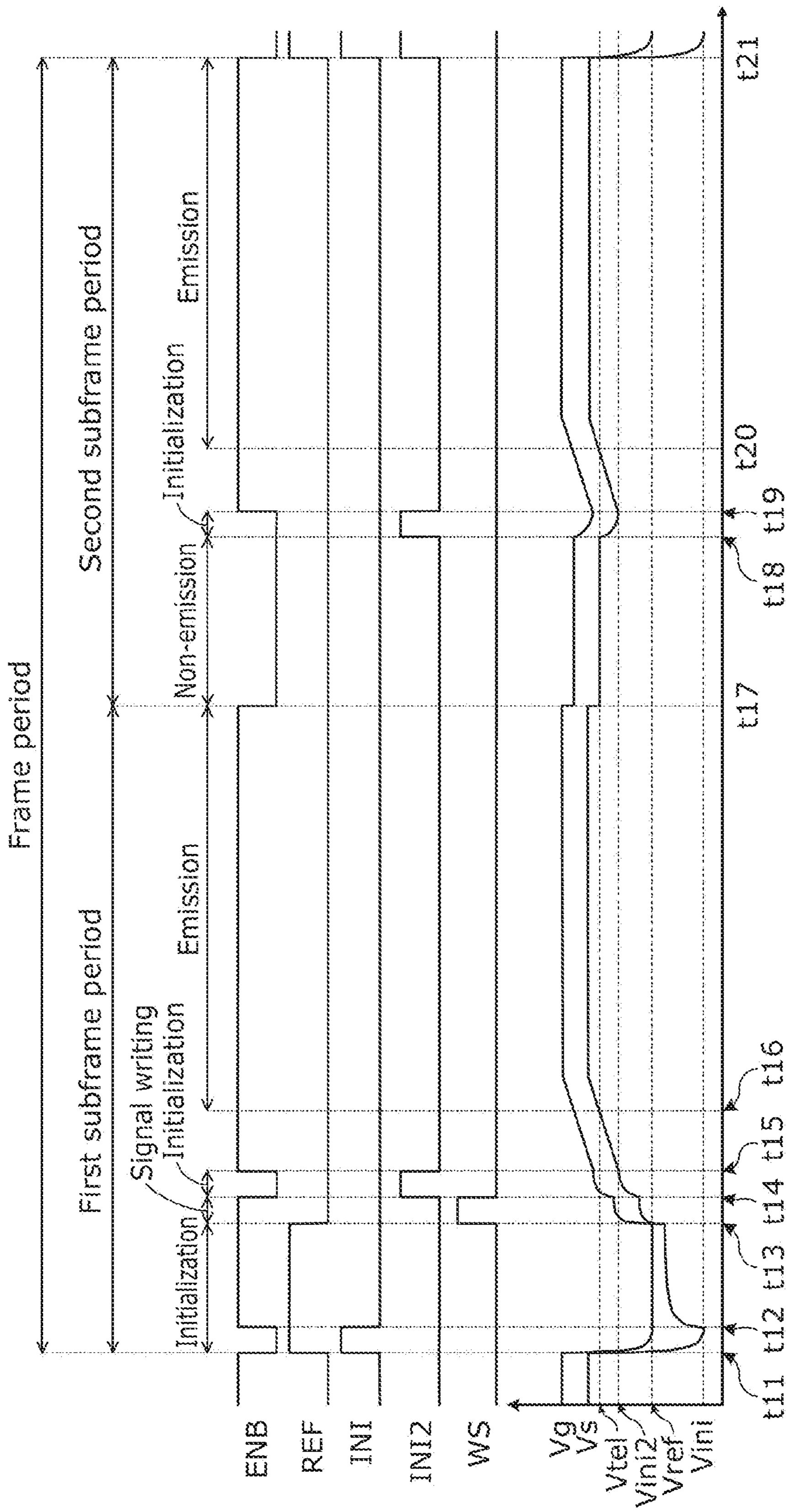
FIG. 16 is a diagram illustrating in detail an operation performed for an LDR video signal by the pixel circuit included in a display device according to Embodiment 2.

The control method of the display device according to the present embodiment is described with reference to FIG. 16. FIG. 16 is a diagram illustrating in detail an operation performed for an LDR video signal by pixel circuit 130 included in the display device according to the present embodiment.

As illustrated in FIG. 16, the present control method is different from the control method of display device 1 according to Embodiment 1 in that control signal INI is maintained at Low level and control signal INI2 is maintained at High level in a period from time t14 to time t15 and a period from time t18 to time t19. With this, second initialization potential Vini2 is applied to the source of drive transistor 33 in the period from time t14 to time t15 and the period from time t18 to time t19.

In the example illustrated in FIG. 16, second initialization potential Vini2 is higher than initialization potential Vini. Thus, time taken by the bootstrapping operation to raise source potential Vs to emission threshold voltage Vtel can be reduced from the time taken in Embodiment 1. More specifically, the emission period in each of the subframe periods can be increased. This results in a gradual slope of dynamic range characteristics (gamma curve) in an LDR region. Furthermore, this can reduce the control accuracy of a signal generation circuit that generates a signal corresponding to the dynamic range and then supplies the signal to pixel circuit 130. Thus, the cost of the signal generation circuit can be reduced.

Embodiment 3

A display device and a control method of the display device according to Embodiment 3 are described. The display device according to the present embodiment is different from the display device according to Embodiment 1 in the configuration of a switch transistor included in a pixel circuit. The following mainly describes differences: between the display device and the control method of the display device according to the present embodiment; and those according to Embodiment 1.

[3-1. Configuration of Pixel Circuit]

Figure 17:
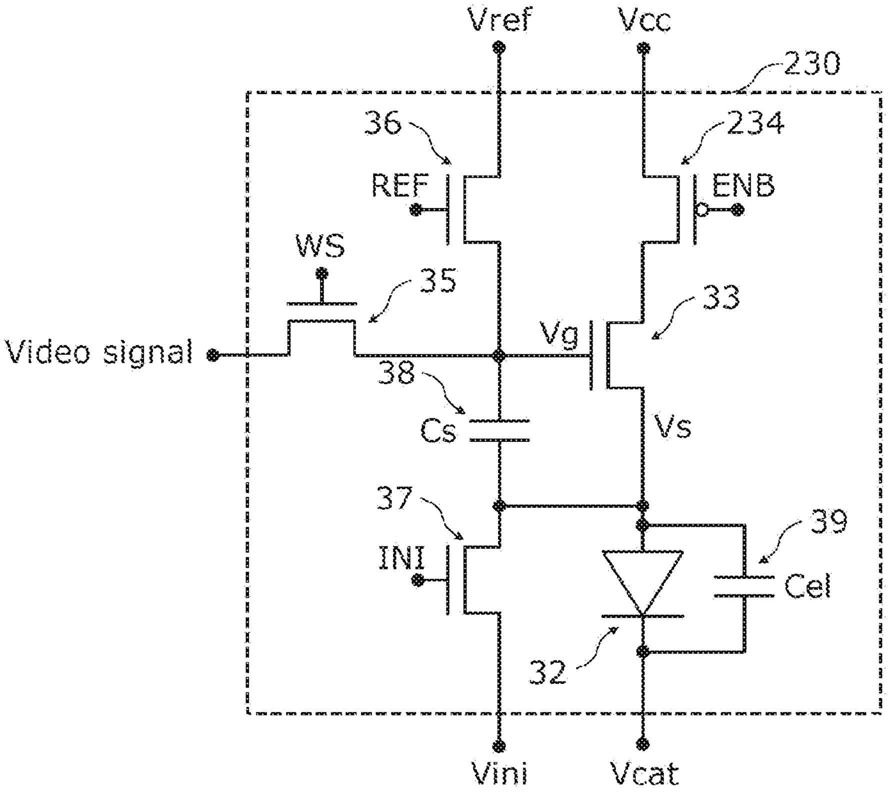
FIG. 17 is a schematic circuit diagram illustrating a configuration of a pixel circuit according to Embodiment 3.

A configuration of the pixel circuit included in the display device according to the present embodiment is described with reference to FIG. 17. FIG. 17 is a schematic circuit diagram illustrating a configuration of pixel circuit 230 according to the present embodiment. The display device according to the present embodiment includes pixel circuit 230 as illustrated in FIG. 17.

Pixel circuit 230 is different from pixel circuit 30 according to Embodiment 1 in the configuration of switch transistor 234.

Switch transistor 234 according to the present embodiment is a p-type (p-channel type) transistor and is thus different from switch transistor 34 according to Embodiment 1. Switch transistor 234 includes a gate that is connected to scanning line 40. Either one of a source and a drain of switch transistor 234 is connected to a drive power source that supplies drive potential Vcc. The other one of the source and the drain of switch transistor 234 is connected to a drain of drive transistor 33. In response to control signal ENB supplied from scanning line 40, switch transistor 234 is turned on or off.

[3-2. Control Method]

The control method of the display device according to the present embodiment is described. The control method of the display device according to the present embodiment is identical to the control method of display device 1 according to Embodiment 1, except that High and Low levels of control signal ENB are reversed relative to the levels of control signal ENB according to Embodiment 1. With this, the display device can be controlled similarly to the case of using the control method of display device 1 according to Embodiment 1.

The control method of the display device according to the present embodiment also achieves the same advantageous effects as the control method of display device 1 according to Embodiment 1. Furthermore, switch transistor 234 according to the present embodiment is a p-type transistor. Thus, the amplitude of control signal ENB can be reduced. This simplifies a configuration of a power source that generates control signal ENB, and thus also reduces the cost of the power source. Furthermore, the potential to be applied to the gate of switches transistor 234 can be reduced. Hence, reliability (in other words, durability) of switch transistor 234 can be increased.

Embodiment 4

A display device and a control method of the display device according to Embodiment 4 are described. The display device according to the present embodiment is different from the display device according to Embodiment 1 mainly in that a pixel circuit does not include switch transistor 34. The following mainly describes differences between: the display device and the control method of the display device according to the present embodiment; and those according to Embodiment 1.

[4-1. Configuration of Pixel Circuit]

Figure 18:
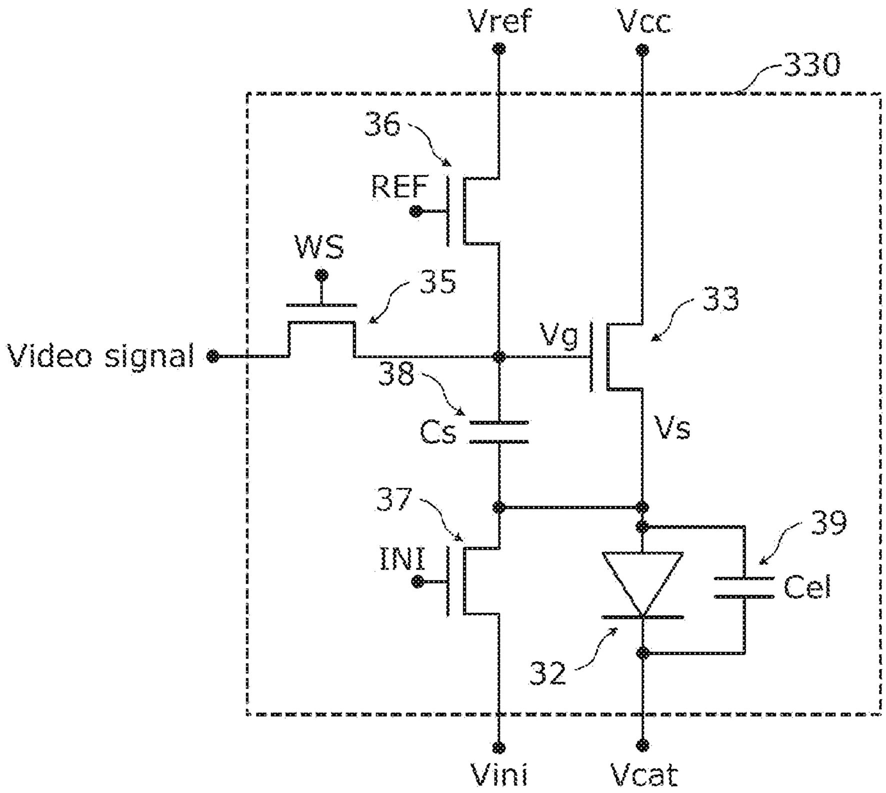
FIG. 18 is a schematic circuit diagram illustrating a configuration of a pixel circuit according to Embodiment 4.

A configuration of the pixel circuit included in the display device according to the present embodiment is described with reference to FIG. 18. FIG. 18 is a schematic circuit diagram illustrating a configuration of pixel circuit 330 according to Embodiment 4. The display device according to the present embodiment includes pixel circuit 330 as illustrated in FIG. 18.

Pixel circuit 330 is identical to pixel circuit 30 according to Embodiment 1, except that switch transistor 34 is not included. To be more specific, a drain of drive transistor 33 is directly connected to a drive power source that supplies drive potential Vcc.

[4-2. Control Method]

Figure 19:
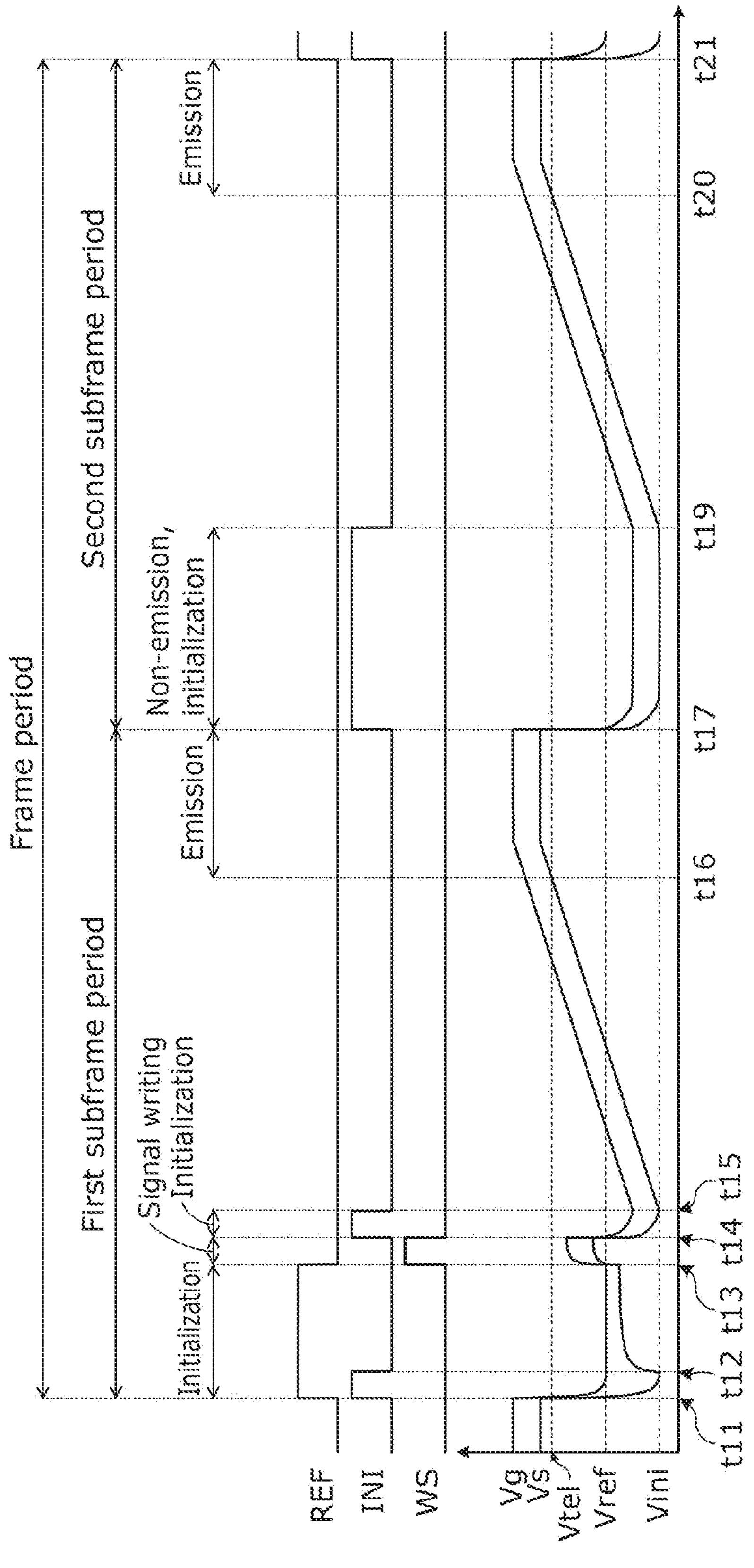
FIG. 19 is a diagram illustrating in detail an operation performed for an LDR video signal by the pixel circuit included in a display device according to Embodiment 4.

The control method of the display device according to the present embodiment is described with reference to FIG. 19. FIG. 19 is a diagram illustrating in detail an operation performed for an LDR video signal by pixel circuit 330 included in the display device according to the present embodiment.

As illustrated in FIG. 19, the control according to the present embodiment is identical to the control according to Embodiment 1, except that control signal ENB is not used before time t17.

In the present embodiment, control signal INI is maintained at High level from time t17 to time t19. With this, source potential Vs of drive transistor 33 is maintained at initialization potential Vini that is lower than the emission threshold voltage, thereby maintaining light emitting element 32 in the non-emission state (this process is referred to as the non-emission step or step (D)). The process performed in the period from time t17 to time t19 corresponds to the second initialization step of applying initialization potential Vini as the second initialization potential to the source of drive transistor 33.

The control performed from time t19 according to the present embodiment is the same as in Embodiment 1.

The present embodiment can achieve the same advantageous effects as Embodiment 1. Furthermore, because switch transistor 34 is not included in the present embodiment, the configuration of pixel circuit 330 can be simplified. Thus, the element density of pixel circuit 330 can be reduced. This enables yield improvement and cost reduction.

Furthermore, control signal INI is not needed in the present embodiment. This simplifies the configuration of gate drive transistor 14.

Embodiment 5

A display device and a control method of the display device according to Embodiment 5 are described. The display device according to the present embodiment is different from the display device according to Embodiment 4 mainly in that a pixel circuit does not include switch transistor 36. The following mainly describes differences between: the display device and the control method of the display device according to the present embodiment; and those according to Embodiment 4.

[5-1. Configuration of Pixel Circuit]

Figure 20:
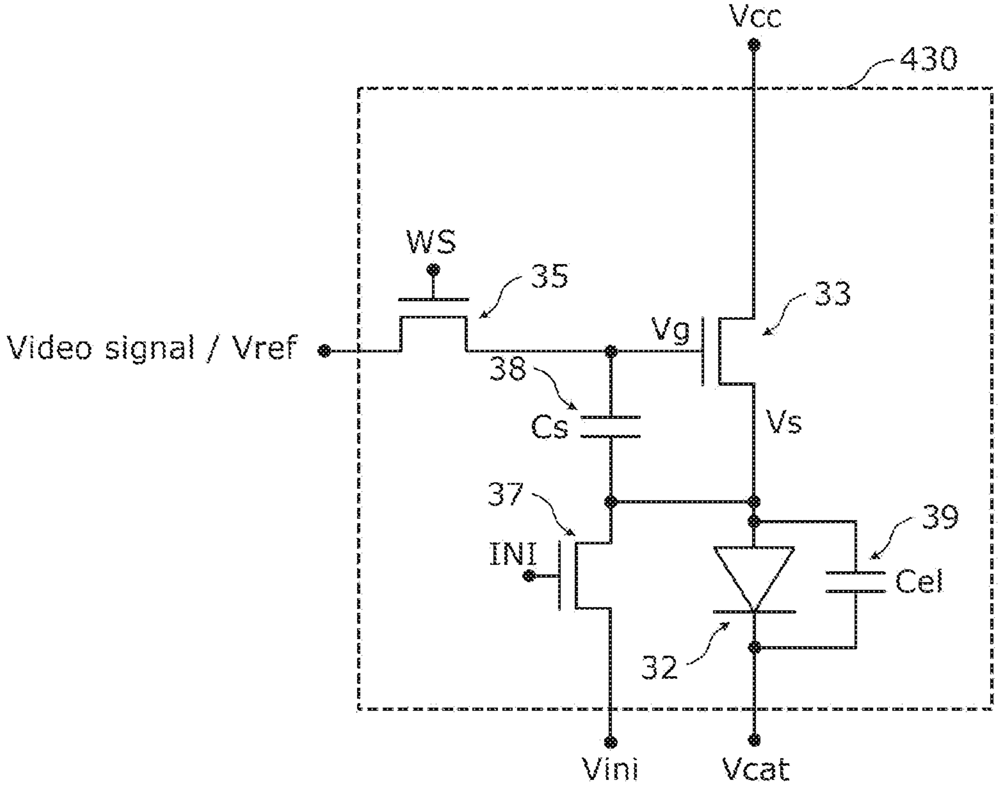
FIG. 20 is a schematic circuit diagram illustrating a configuration of a pixel circuit according to Embodiment 5.

A configuration of the pixel circuit included in the display device according to the present embodiment is described with reference to FIG. 20. FIG. 20 is a schematic circuit diagram illustrating a configuration of pixel circuit 430 according to the present embodiment. The display device according to the present embodiment includes pixel circuit 430 as illustrated in FIG. 18.

Pixel circuit 430 is different from pixel circuit 330 according to Embodiment 4 in that switch transistor 36 is not included. To enable an operation of pixel circuit 430 as described, signal line 42 connected to selection transistor 35 is applied with a signal voltage of a video signal and a reference potential Vref at respective predetermined timings. To be more specific, reference potential Vref is applied to signal line 42 in the first initialization period, and the signal voltage of the video signal is applied to signal line 42 in the signal writing period.

[5-2. Control Method]

Figure 21:
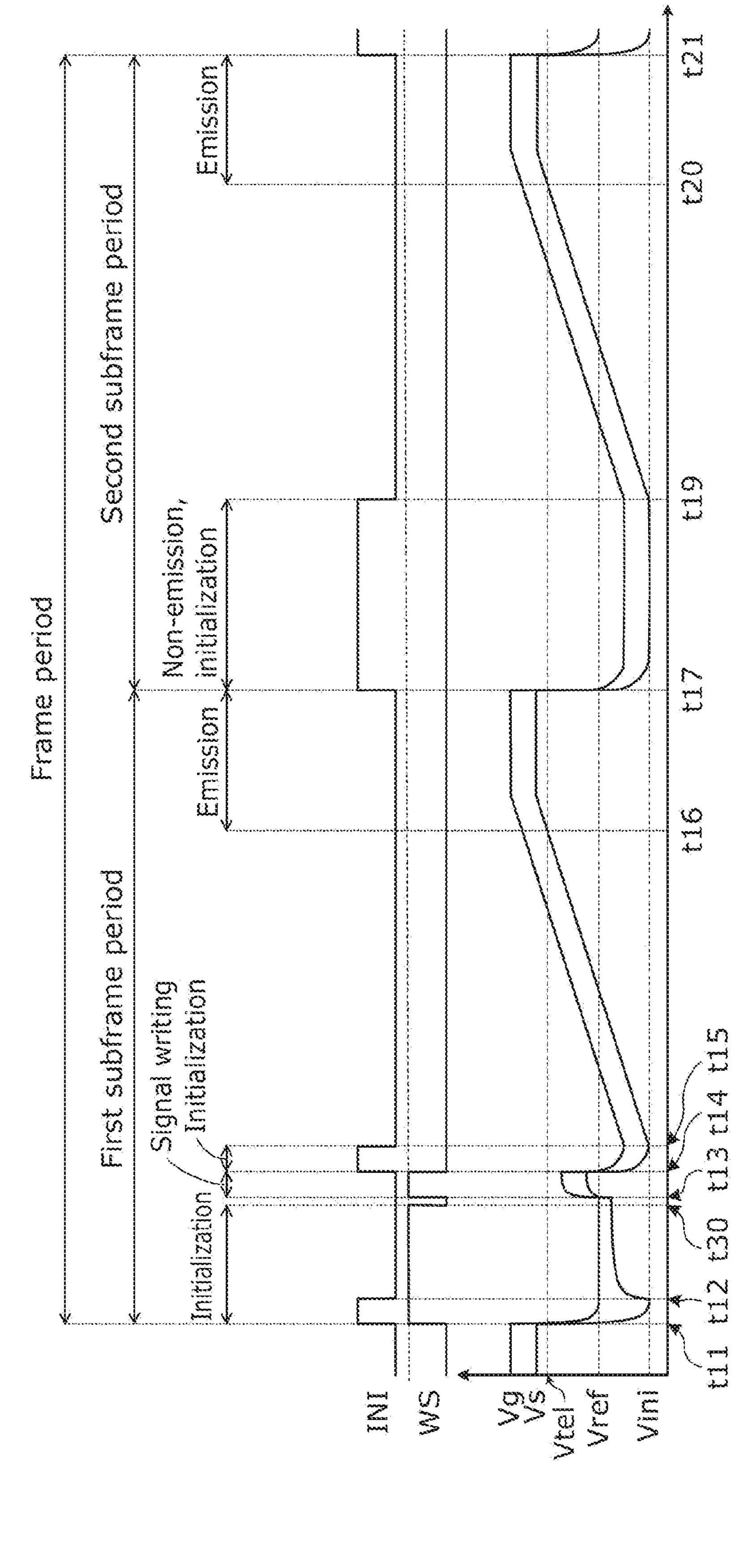
FIG. 21 is a diagram illustrating in detail an operation performed for an LDR video signal by the pixel circuit included in a display device according to Embodiment 5.

The control method of the display device according to the present embodiment is described with reference to FIG. 21. FIG. 21 is a diagram illustrating in detail an operation performed for an LDR video signal by pixel circuit 430 included in the display device according to the present embodiment.

As illustrated in FIG. 21, control signal INI and control signal WS are switched to High level at time t11 in the present embodiment. At this time, reference potential Vref is being applied to signal line 42. As a result, pixel circuit 430 according to the present embodiment is in the same state as pixel circuit 330 at time t11 in Embodiment 4.

After this, control signal INI is switched to Low level at time t12.

After this, control signal WS is switched to Low level at time t30 between time t12 and time t13.

After this, control signal WS is switched to High level at time t13. At this time, the signal voltage of the video signal is being applied to signal line 42. This enables the signal writing.

The control performed from time t14 according to the present embodiment is the same as in Embodiment 4.

The present embodiment can achieve the same advantageous effects as Embodiment 1. Furthermore, because switch transistor 36 is not included in the present embodiment, the configuration of pixel circuit 430 can be further simplified. Thus, the element density of pixel circuit 530 can be reduced. This enables yield improvement and cost reduction.

Furthermore, control signal REF is not needed in the present embodiment. This simplifies the configuration of gate drive transistor 14.

Embodiment 6

A display device and a control method of the display device according to Embodiment 6 are described. The display device according to the present embodiment is different from the display device according to Embodiment 5 mainly in that a pixel circuit does not include switch transistor 37. The following mainly describes differences between: the display device and the control method of the display device according to the present embodiment; and those according to Embodiment 5.

[6-1. Configuration of Pixel Circuit]

Figure 22:
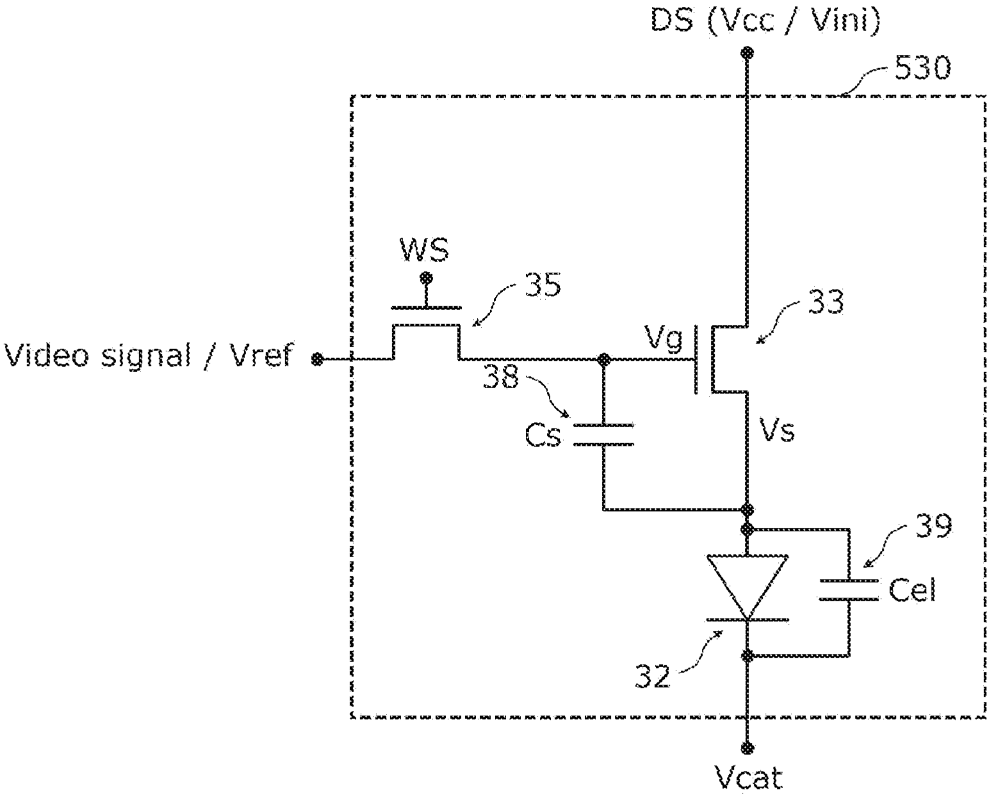
FIG. 22 is a schematic circuit diagram illustrating a configuration of a pixel circuit according to Embodiment 6.

A configuration of the pixel circuit included in the display device according to the present embodiment is described with reference to FIG. 22. FIG. 22 is a schematic circuit diagram illustrating a configuration of pixel circuit 530 according to the present embodiment. The display device according to the present embodiment includes pixel circuit 530 as illustrated in FIG. 22.

Pixel circuit 530 is different from pixel circuit 430 according to Embodiment 5 in that switch transistor 37 is not included. To enable an operation of pixel circuit 530 as described, drive power source DS supplies drive potential Vcc or initialization potential Vini to a drain of drive transistor 33.

[6-2. Control Method]

Figure 23:
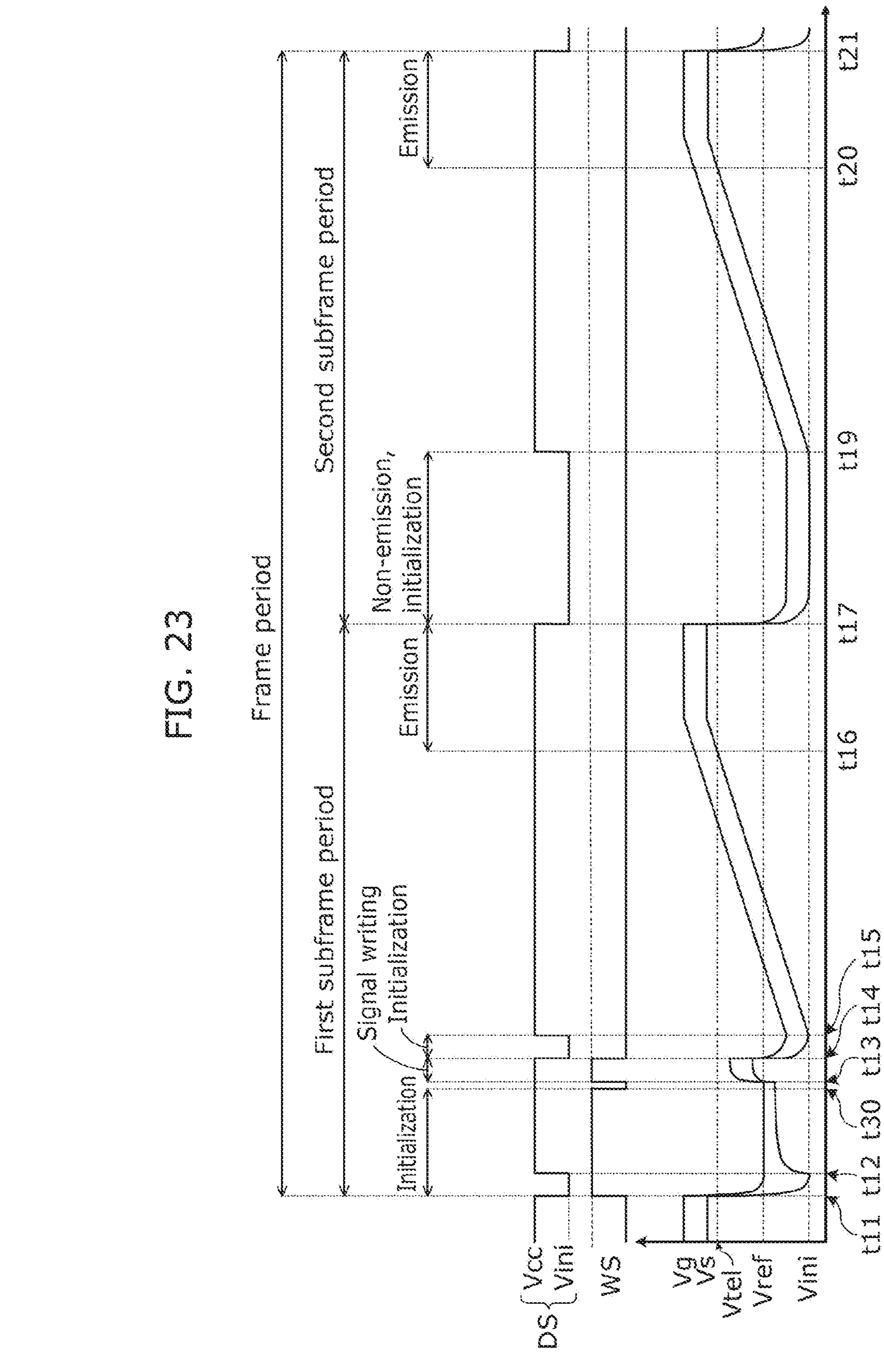
FIG. 23 is a diagram illustrating in detail an operation performed for an LDR video signal by the pixel circuit included in a display device according to Embodiment 6.

The control method of the display device according to the present embodiment is described with reference to FIG. 23. FIG. 23 is a diagram illustrating in detail an operation performed for an LDR video signal by pixel circuit 530 included in the display device according to the present embodiment.

As illustrated in FIG. 23, control signal WS is switched to High level at time t11 in the present embodiment. Furthermore, drive power source DS outputs initialization potential Vini. At this time, reference potential Vref is being applied to signal line 42.

After this, an output potential of drive power source DS is switched to drive potential Vcc at time t12.

After this, control signal WS is switched to Low level at time t30 between time t12 and time t13.

After this, control signal WS is switched to High level at time t13. At this time, the signal voltage of the video signal is being applied to signal line 42. This enables the signal writing.

After this, the output potential of drive power source DS is switched to initialization potential Vini at time t14. This enables the application of initialization potential Vini to a source of drive transistor 33 via drive transistor 33 (this process is referred to as the third initialization step or step (G)).

After this, the output potential of drive power source DS is switched to drive potential Vcc at time t15. This enables the application of a current to light emitting element 32 via drive transistor 33.

After this, light emitting element 32 starts emission at time t16 (this process is referred to as the first emission step or step (C)).

After this, the output potential of drive power source DS is switched to initialization potential Vini at time t17. This enables the application of initialization potential Vini to the source of drive transistor 33 via drive transistor 33 (this process is referred to as the second initialization step or step (E)). Following this, light emitting element 32 stops the emission (this process is referred to as the non-emission step or step (D)).

After this, the output potential of drive power source DS is switched to drive potential Vcc at time t19. This enables the application of a current to light emitting element 32 via drive transistor 33.

After this, light emitting element 32 starts emission at time t20 (this process is referred to as the second emission step or step (F)).

The present embodiment can achieve the same advantageous effects as Embodiment 5. Furthermore, because switch transistor 37 is not included in the present embodiment, the configuration of pixel circuit 530 can be further simplified. Thus, the element density of pixel circuit 530 can be reduced. This enables yield improvement and cost reduction.

Furthermore, control signal INI is not needed in the present embodiment. This simplifies the configuration of gate drive transistor 14.

Embodiment 7

A display device and a control method of the display device according to Embodiment 7 are described. The display device according to the present embodiment is different from the display device according to Embodiment 6 mainly in the configuration of drive power source DS. The following mainly describes differences between: the display device and the control method of the display device according to the present embodiment; and those according to Embodiment 6.

[7-1. Configuration of Pixel Circuit]

Figure 24:
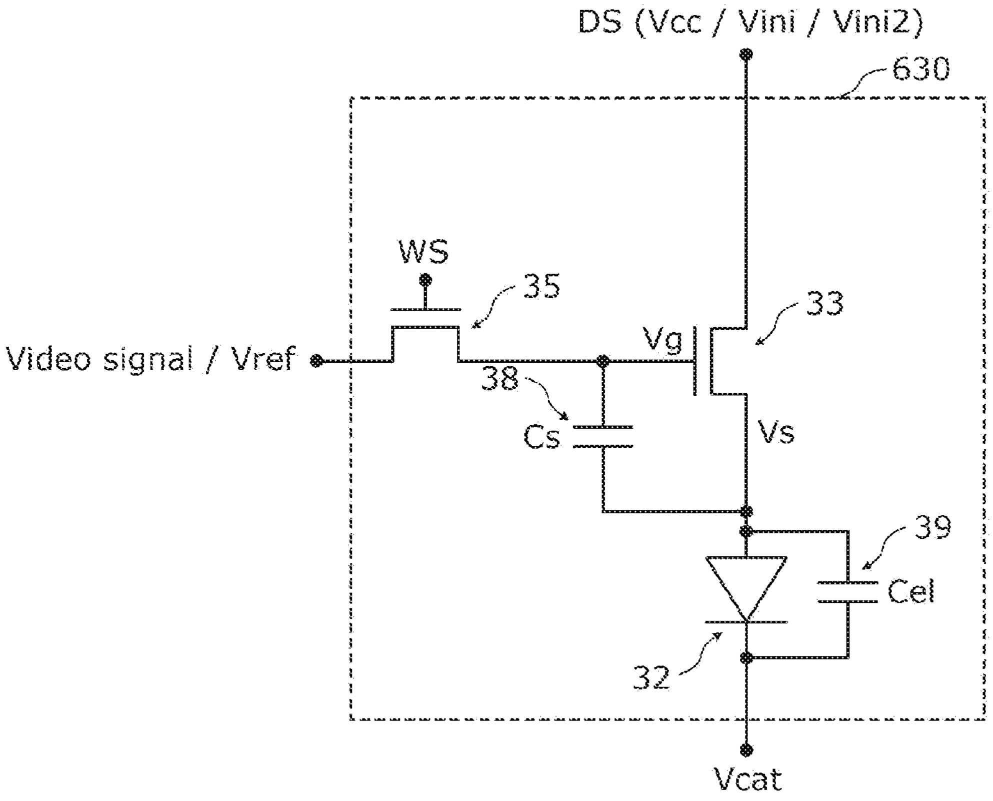
FIG. 24 is a schematic circuit diagram illustrating a configuration of a pixel circuit according to Embodiment 7.

A configuration of the pixel circuit included in the display device according to the present embodiment is described with reference to FIG. 24. FIG. 24 is a schematic circuit diagram illustrating a configuration of pixel circuit 630 according to the present embodiment. The display device according to the present embodiment includes pixel circuit 630 as illustrated in FIG. 24.

Pixel circuit 630 is different from pixel circuit 530 according to Embodiment 6 in the configuration of drive power source DS. In the present embodiment, drive power source DS supplies drive potential Vcc, initialization potential Vini, or second initialization potential Vini2 to a drain of drive transistor 33.

[7-2. Control Method]

Figure 25:
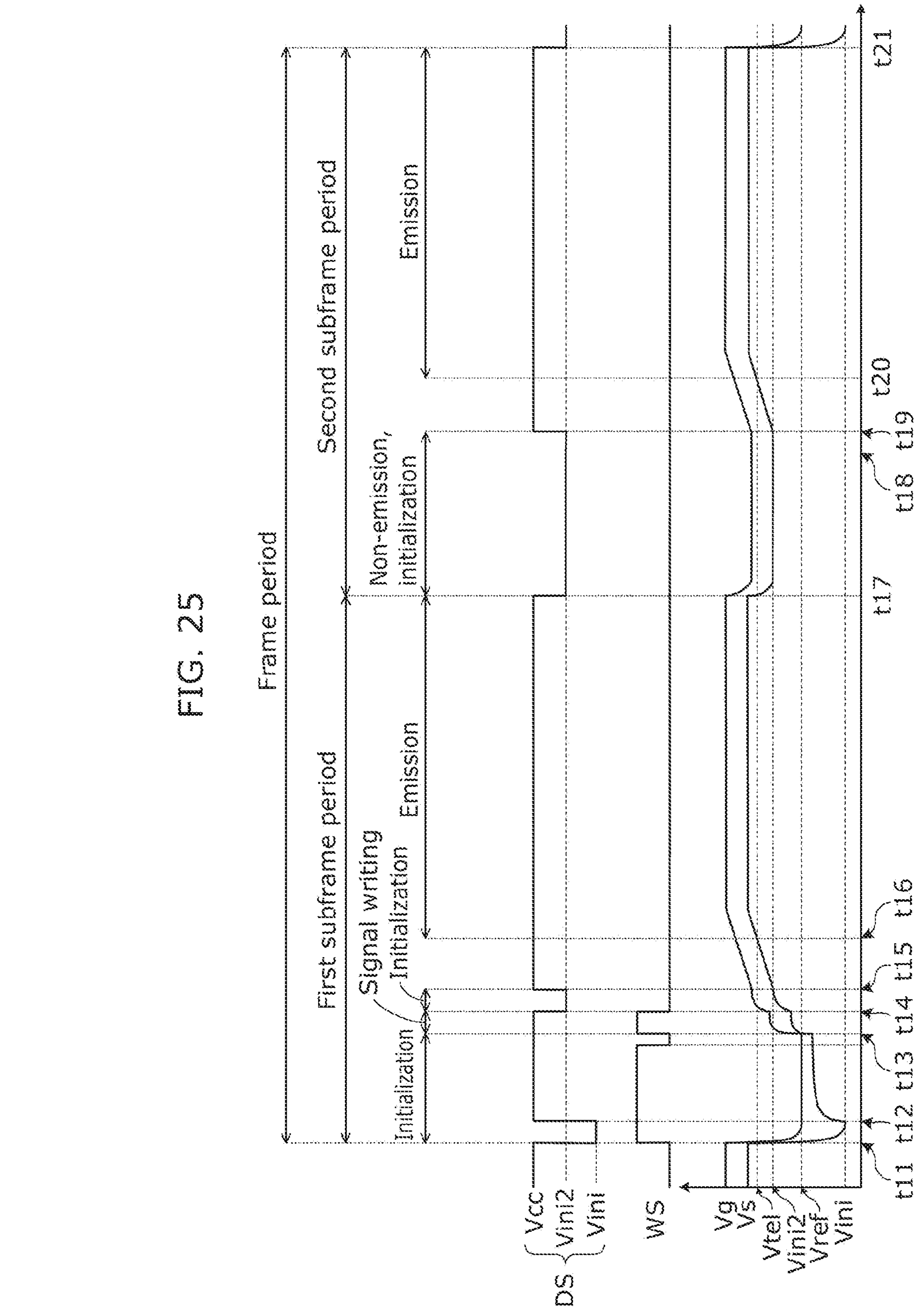
FIG. 25 is a diagram illustrating in detail an operation performed for an LDR video signal by the pixel circuit included in a display device according to Embodiment 7.

The control method of the display device according to the present embodiment is described with reference to FIG. 25. FIG. 25 is a diagram illustrating in detail an operation performed for an LDR video signal by pixel circuit 630 included in the display device according to the present embodiment.

As illustrated in FIG. 25, drive power source DS outputs initialization potential Vini in a first initialization period from time t11 to time t12, in the present embodiment.

Furthermore, drive power source DS outputs second initialization potential Vini2 higher than initialization potential Vini in a third initialization period from time t14 to time t15 and in a second initialization period from time t17 to time t19.

The present embodiment can achieve the same advantageous effects as Embodiment 6. Furthermore, second initialization potential Vini2 higher than initialization potential Vini is applied to the source of drive transistor 33 in the second initialization period and the third initialization period. Thus, the control method according to the present embodiment can also achieve the same advantageous effects as the control method according to Embodiment 2.

Embodiment 8

A display device and a control method of the display device according to Embodiment 8 are described. The display device according to the present embodiment is different from the display device according to Embodiment 3 mainly in that switch transistor 37 is disposed outside a pixel circuit. The following mainly describes differences between: the display device and the control method of the display device according to the present embodiment; and those according to Embodiment 3.

[8-1. Configuration of Pixel Circuit]

Figure 26:
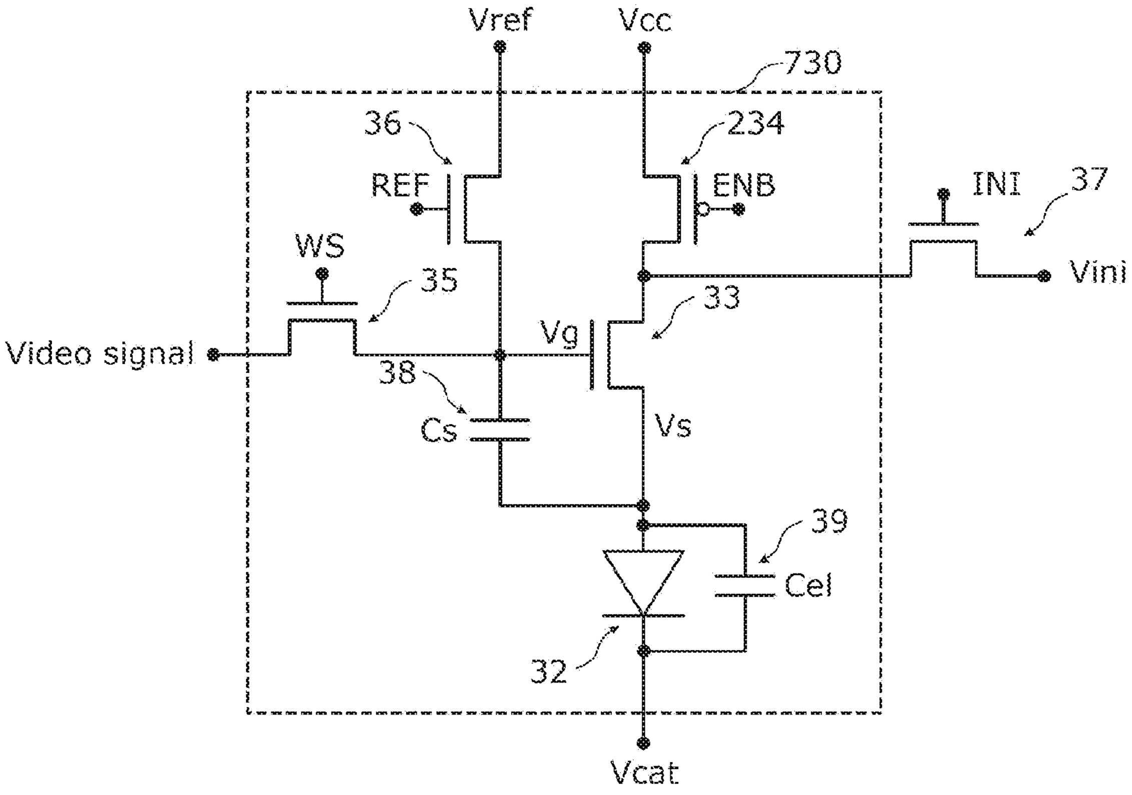
FIG. 26 is a schematic circuit diagram illustrating a configuration of a pixel circuit according to Embodiment 8.

A configuration of the pixel circuit included in the display device according to the present embodiment is described with reference to FIG. 26. FIG. 26 is a schematic circuit diagram illustrating a configuration of pixel circuit 730 according to the present embodiment. The display device according to the present embodiment includes pixel circuit 730 as illustrated in FIG. 26.

Pixel circuit 730 is different from pixel circuit 230 according to Embodiment 3 in the placement of switch transistor 37. In the present embodiment, switch transistor 37 is disposed outside pixel circuit 730. To be more specific, switch transistor 37 is disposed in a peripheral circuit outside display section 12. Gate drive circuit 14 outputs control signal INI to a gate of switch transistor 37 disposed in the peripheral circuit.

[8-2. Control Method]

The control method of the display device according to the present embodiment is identical to the control method of the display device according to Embodiment 3. The control method of the display device according to the present embodiment can also achieve the same advantageous effects as the control method of the display device according to Embodiment 3.

Furthermore, switch transistor 37 is disposed outside pixel circuit 730 in the present embodiment. Thus, the element density of pixel circuit 730 can be reduced. This enables yield improvement and cost reduction.

Embodiment 9

A display device and a control method of the display device according to Embodiment 9 are described. The present embodiment describes an example where the display device includes an organic EL element.

[9-1. Configuration of Display Device]

Figure 27:
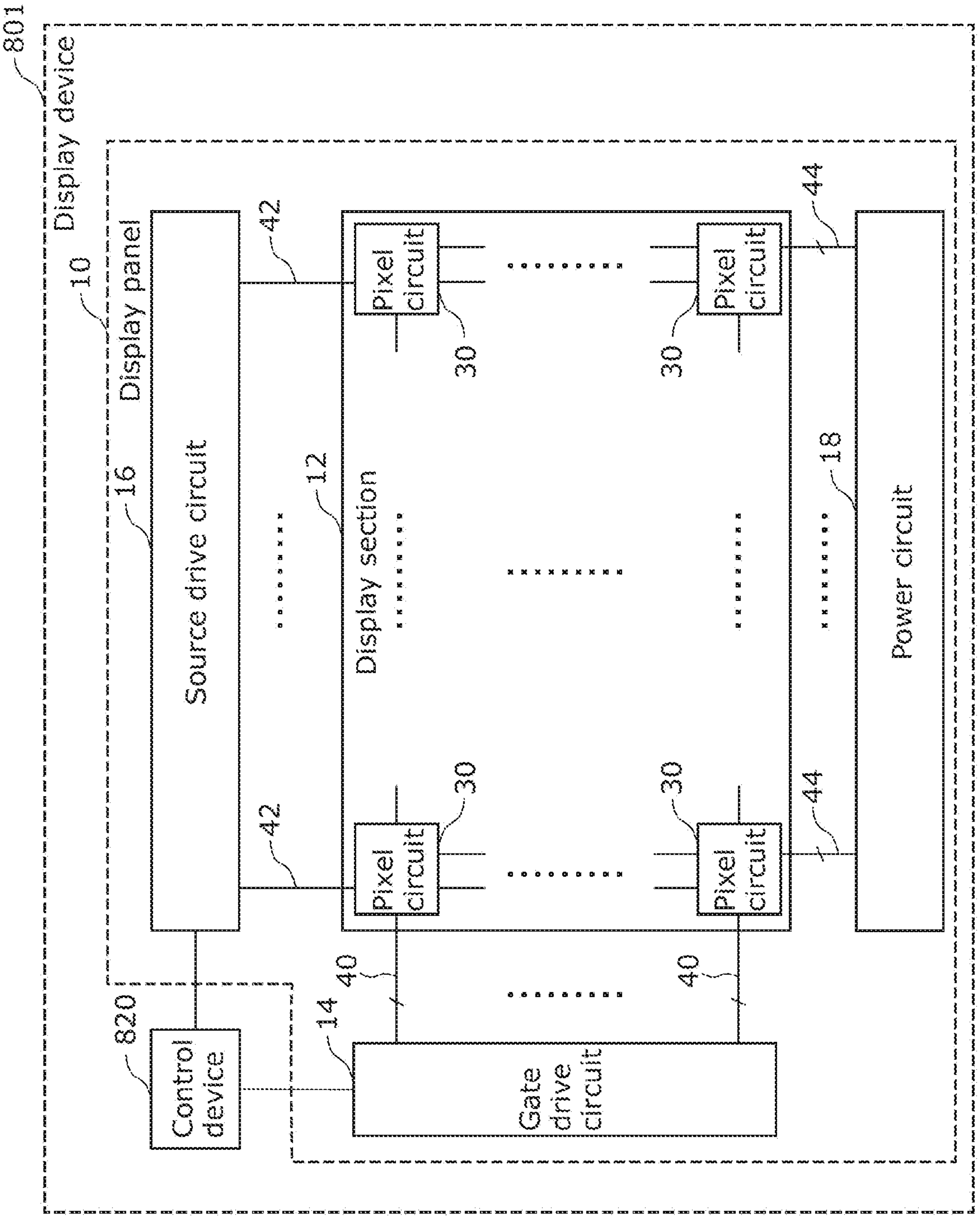
FIG. 27 is a schematic diagram illustrating an example of a configuration of a display device according to Embodiment 9.

A configuration of the display device according to the present embodiment is described with reference to FIG. 27. FIG. 27 is a schematic diagram illustrating an example of a configuration of display device 801 according to the present embodiment. As illustrated in FIG. 27, display device 801 includes display panel 10 and control device 820.

[9-2. Configuration of Display Panel]

As illustrated in FIG. 27, display panel 10 includes display section 12 that includes a plurality of pixel circuits 30. Moreover, display panel 10 includes gate drive circuit 14, source drive circuit 16, and power circuit 18, as peripheral circuits of display section 12. Display section 12, gate drive circuit 14, source drive circuit 16, scanning line 40, signal line 42, and power line 44 are implemented on a panel substrate (not shown) that is made of glass or resin, such as acrylic, for example. Note that gate drive circuit 14 and source drive circuit 16 need not be implemented on the panel substrate. For example, gate drive circuit 14 and source drive circuit 16 may be implemented on, for example, a flexible substrate connected to the panel substrate, by chip-on-film or chip-on-flexible (COF) technology.

Display section 12 displays video based on a video signal externally inputted into display panel 10. As illustrated in FIG. 27, display panel 12 includes the plurality of pixel circuits 30 arranged in a matrix. Furthermore, display panel 12 includes scanning lines 40 in rows (extending in the horizontal direction in FIG. 27) and signal lines 42 and power lines 44 in columns (extending in the vertical direction in FIG. 27). In display panel 12, an initialization operation, a writing operation, and an emission operation are performed for each of the rows of the plurality of pixel circuits 30 sequentially.

The plurality of pixel circuits 30 are arranged in a matrix in display panel 10. To be more specific, each of the plurality of pixel circuits 30 is disposed at an intersection of scanning line 40 and signal line 42. A configuration of pixel circuit 30 is described in detail later.

Scanning line 40 is disposed for each of the rows of the plurality of pixel circuits 30. One end of scanning line 40 is connected to pixel circuit 30, and the other end of scanning line 40 is connected to gate drive circuit 14.

Signal line 42 is disposed for each of the columns of the plurality of pixel circuits 30. One end of signal line 42 is connected to pixel circuit 30, and the other end of signal line 42 is connected to source drive circuit 16.

Power line 44 is disposed for each column of the plurality of pixel circuits 30. One end of power line 44 is connected to pixel circuit 30, and the other end of power line 44 is connected to power circuit 18. The plurality of pixel circuits 30 are connected to a plurality of power lines 44. Each of the plurality of power lines 44 is applied with a different potential. Note that although power lines 44 are arranged in columns in FIG. 27, wiring design of power lines 44 is not limited to this. Power lines 44 may be arranged according to any wiring design that enables power circuit 18 to apply a potential to each of the plurality of pixel circuits 30. For example, power lines 44 may be arranged in columns and rows. When power lines 44 are arranged in columns and rows, the number of columns of power lines 44 may be less than the number of columns of pixel circuits 30 arranged in the matrix.

Gate drive circuit 14 is also referred to as a scanning line drive circuit, and is implemented by a shift register, for example. Gate drive circuit 14 is connected to scanning line 40. Gate drive circuit 14 performs on-off control on a transistor included in pixel circuit 30, by outputting a gate control signal to scanning line 40. For example, gate drive circuit 14 according to the present embodiment outputs, to a gate of the transistor included in pixel circuit 30, control signal WS, control signal REF, control signal INI, and control signal ENB as gate control signals for the on-off control over the transistor.

Source drive circuit 16 is also referred to as a signal line drive circuit. Source drive circuit 16 is connected to signal line 42. Source drive circuit 16 outputs, to signal line 42, a signal corresponding to a video signal supplied for each frame by control device 820, and thereby supplies this video signal to pixel circuit 30. Source drive circuit 16 writes, into pixel circuit 30, brightness information based on the video signal as a current value or as a voltage value. Note that the video signal inputted to source drive circuit 16 is digital serial data for each of three primary colors, red (R), green (G), and blue (B) (that is, video signals R, G, and B). Video signals R, G, and B inputted to source drive circuit 16 are converted into parallel data for each row in source drive circuit 16. Furthermore, the parallel data for each row is converted into analog data for each row in source drive circuit 16. Then, the analog data is outputted as a video signal to signal line 42. Note that although the plurality of pixel circuits 30 include pixel circuit 30 that supports the RGB primary colors in the above description, the configuration of the plurality of pixel circuits 30 is not limited to this. For example, the plurality of pixel circuits 30 may include pixel circuit 30 that supports R, G, B, and white (W).

Power circuit 18 applies a potential to each of plurality of pixel circuits 30. Power circuit 18 generates a plurality of potentials that are different from each other, and applies the potentials to the plurality of pixel circuits 30 via the plurality of power lines 44.

[9-3. Configuration of Pixel Circuit]

Figure 28:
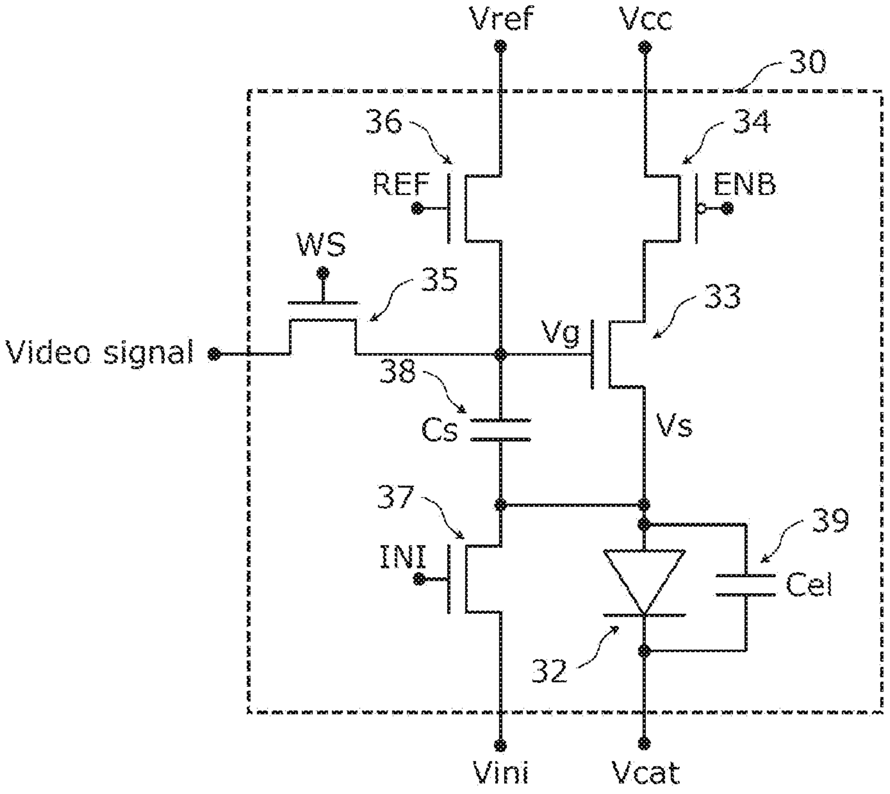
FIG. 28 is a schematic circuit diagram illustrating a configuration of a pixel circuit according to Embodiment 9.

A configuration of pixel circuit 30 is described with reference to FIG. 28. FIG. 28 is a schematic circuit diagram illustrating the configuration of pixel circuit 30 according to the present embodiment.

The plurality of pixel circuits 30 are arranged in a matrix with N rows and M columns. Here, "N" and "M" depend on size and resolution of a display screen. For example, to achieve a resolution regarded as high definition (HD) by pixel circuits 30 adjacent to each other in a row and supporting the RGB primary colors, the number of N is at least 1080 and the number of M is at least 1920×3 columns. In the present embodiment, pixel circuit 30 includes light emitting element 32 as an organic EL element.

As illustrated in FIG. 28, pixel circuit 30 includes light emitting element 32, drive transistor 33, selection transistor 35, switch transistors 34, 36, and 37, and pixel capacitance 38. Note that pixel capacitance 38 is also indicated as "Cs" in FIG. 28.

Light emitting element 32 includes a cathode and an anode. The cathode is connected to power line that is applied with cathode potential Vcat. The anode is connected to a source of drive transistor 33. Light emitting element 32 is applied with a current supplied from drive transistor 33 corresponding to a signal voltage of a video signal, and thereby emits light with brightness corresponding to this signal voltage. For example, light emitting element 32 is an organic El element. Note that light emitting element 32 is not limited to an organic EL element, and may be a self-luminous element, such as an inorganic EL element or a quantum dot light-emitting diode (QLED). Alternatively, if controllable by current drive, light emitting element 32 need not be a self-luminous element.

Drive transistor 33 includes a gate, the source, and a drain. The gate of drive transistor 33 is connected to, for example, either one of electrodes of pixel capacitance 38. The drain of drive transistor 33 is connected to a source of switch transistor 34. The source of drive transistor 33 is connected to the anode of light emitting element 32, and also to, for example, the other one of the electrodes of pixel capacitance 38. Drive transistor 33 converts a signal voltage applied between the gate and the source (this voltage is referred to as a gate-source voltage) into a current corresponding to the signal voltage (this current is referred to as a drain-source current). As a result, drive transistor 33 is turned on and thus supplies light emitting element 32 with the drain-source current to cause light emitting element 32 to emit light. For example, drive transistor 33 is implemented by an n-type thin-film transistor (n-type TFT).

Switch transistor 34 includes a gate that is connected to scanning line 40. Either one of the source and a drain of switch transistor 34 is connected to power line 44 that supplies drive potential Vcc. The other one of the source and the drain of switch transistor 34 is connected to the drain of drive transistor 33. In response to control signal ENB supplied from scanning line 40, switch transistor 34 is turned on or off. Upon being turned on, switch transistor 34 connects drive transistor 33 to power line 44 applied with drive potential Vcc. As a result, the drain-source current of drive transistor 33 is supplied to light emitting element 32. For example, switch transistor 34 is implemented by an n-type TFT.

Selection transistor 35 includes a gate that is connected to scanning line 40. Either one of a source and a drain of selection transistor 35 is connected to signal line 42. The other one of the source and the drain of selection transistor 35 is connected to either one of the electrodes of pixel capacitance 38. In response to control signal WS supplied from scanning line 40, selection transistor 35 is turned on or off. Upon being turned on, selection transistor 35 applies a signal voltage of a video signal supplied from signal line 42 to the electrode of pixel capacitance 38. As a result, electric charge corresponding to the signal voltage is accumulated in pixel capacitance 38. For example, selection transistor 35 is implemented by an n-type TFT.

By the control method of display device 801 according to the present embodiment, the potential of the gate of drive transistor 33 connected to the source or drain of switch transistor 35 varies widely from a potential higher than the signal voltage to a potential lower than the signal voltage, as described later. For this reason, the control method of display device 801 according to the present embodiment needs to maintain switch transistor 35 in the off-state within a wider gate-source voltage range as compared to a conventional control method. To reduce leakage current of switch transistor 35 within the wide gate-source voltage range and maintain switch transistor 35 in the off-state, an oxide semiconductor TFT may be used for switch transistor 35. Alternatively, a multi-channel TFT including a plurality of segmented gate electrodes may be used.

Switch transistor 36 includes a gate that is connected to scanning line 40. Either one of a source and a drain of switch transistor 36 is connected to power line 44 that supplies reference potential Vref. The other one of the source and the drain of switch transistor 36 is connected to, for example, one of the electrodes of pixel capacitance 38 and to the gate of drive transistor 33. In response to control signal REF supplied from scanning line 40, switch transistor 36 is turned on or off. Upon being turned on, switch transistor 36 sets the electrode of pixel capacitance 38 at reference potential Vref. For example, selection transistor 36 is implemented by an n-type TFT.

Furthermore, the control method of display device 801 according to the present embodiment needs to maintain switch transistor 36 in the off-state within a wider gate-source voltage range as compared to the conventional control method, as with switch transistor 35. To reduce leakage current of switch transistor 36 within the wide gate-source voltage range and maintain switch transistor 36 in the off-state, an oxide semiconductor TFT may be used for switch transistor 36. Alternatively, a multi-channel TFT including a plurality of segmented gate electrodes may be used. If switch transistor 35 is a multi-channel TFT, switch transistor 36 may be a multi-channel TFT that includes as many channels as switch transistor 35 or that includes the number of channels more than the number of channels of switch transistor 35 by one.

Switch transistor 37 includes a gate that is connected to scanning line 40. Either one of a source and a drain of switch transistor 37 is connected to the source of drive transistor 33 and to the other one of the electrodes of pixel capacitance 38. The other one of the source and the drain of switch transistor 37 is connected to power line 44 that supplies initialization potential Vini. In response to control signal INI supplied from scanning line 40, switch transistor 37 is turned on or off. Upon being turned on, switch transistor 37 sets the potential of the anode of light emitting element 32 at initialization potential Vini. For example, selection transistor 37 is implemented by an n-type TFT.

Pixel capacitance 38 is a capacitance to be applied with a video signal. One end of pixel capacitance 38 is connected to the gate of drive transistor 33, and the other end of pixel capacitance 38 is connected to the source of drive transistor 33. The one end of pixel capacitance 38 is also connected to the source of selection transistor 35 and to the source of switch transistor 36. Pixel capacitance 38 accumulates electric charge corresponding to a video signal supplied from signal line 42. For example, after selection transistor 35 and switch transistor 36 are off, pixel capacitance 38 stably maintains the gate-source voltage of drive transistor 33. In this way, when selection transistor 35 and switch transistor 36 are off, pixel capacitance 38 applies a voltage between the gate and the source of drive transistor 33, according to a voltage corresponding to the accumulated electric charge.

EL capacitance 39 corresponds to a parasitic capacity inherent in light emitting element 32 that is an EL element. After the voltage between the electrodes rises as a result of the charging of this capacity, current starts flowing into light emitting element 32. Then, light emitting element 32 starts emitting light. Note that EL capacitance 39 is also indicated as “Cel”.

Note that each of the conductivity types of drive transistor 33, selection transistor 35, switch transistor 36, and switch transistor 37 is not limited to the type described above. For example, switch transistor 34 may be an n-type TFT. These transistors may include both n-type TFTs and p-type TFTs as appropriate. Furthermore, each of these transistors need not be implemented by a polysilicon TFT, and may be implemented by an amorphous silicon TFT or an oxide semiconductor TFT for example.

[9-4. Configuration of Control Device]

Figure 29:
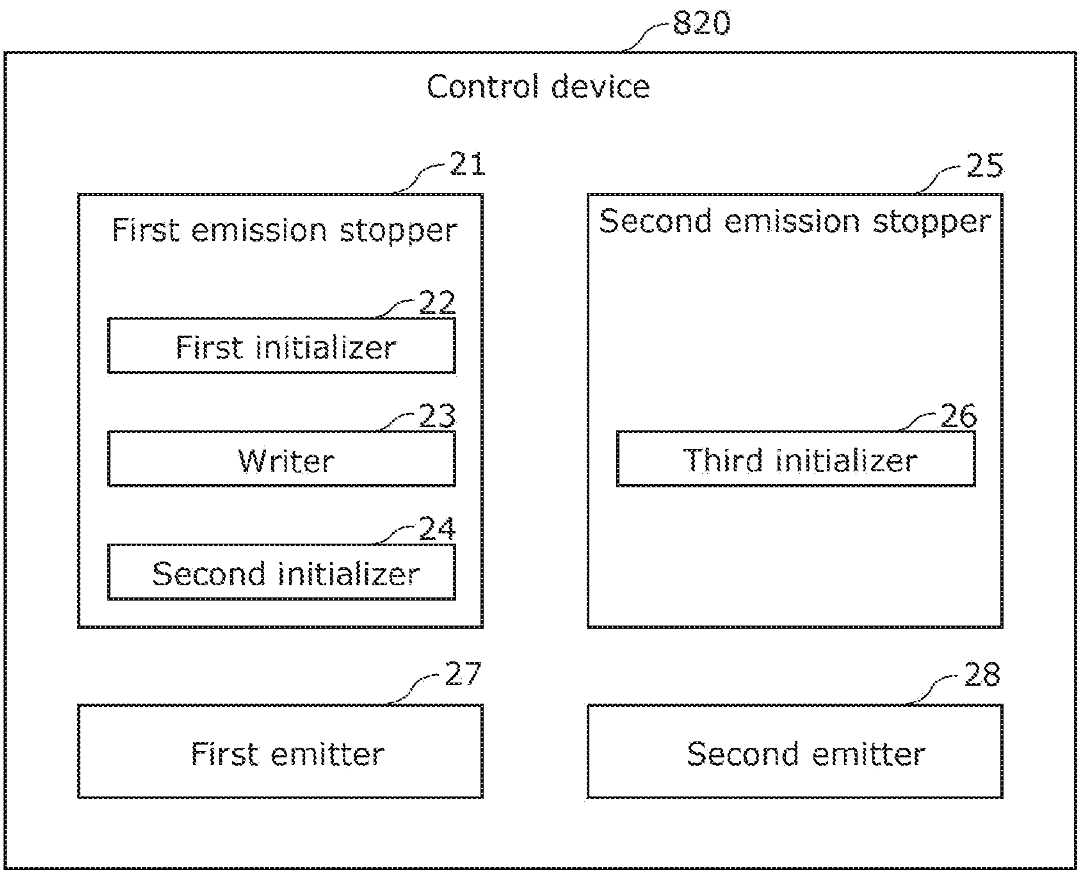
FIG. 29 is a block diagram illustrating a functional configuration of a control device according to Embodiment 9.

A functional configuration of control device 820 of display device 801 according to the present embodiment is described with reference to FIG. 29. FIG. 29 is a block diagram illustrating the functional configuration of control device 820 according to the present embodiment. As illustrated in FIG. 29, control device 820 according to the present embodiment includes first emission stopper 21, first emitter 27, second emission stopper 25, and second emitter 28, from a functional perspective.

For display device 801 according to the present embodiment, a frame period during which one image continues to be displayed includes a first subframe period and at least one second subframe period that follows the first subframe period. Each of the at least one second subframe period is equal in length to the first subframe period.

First emission stopper 21 is a processor that maintains light emitting element 32 in the non-emission state for a predetermined non-emission period in the first subframe period. First emission stopper 21 controls the state of light emitting element 32 by controlling a control signal sent from gate drive circuit 14 to the transistor of pixel circuit 30. First emission stopper 21 includes first initializer 22, writer 23, and second initializer 24. First initializer 22 is a processer that applies initialization potential Vini, which is predetermined, to the source of drive transistor 33 for a predetermined initialization period. Writer 23 is a processor that applies a signal corresponding to the image displayed in the frame period, to pixel capacitance 38. Second initializer 24 is a processor that applies initialization potential Vini to the source of drive transistor 33.

First emitter 27 causes light emitting element 32 to emit light by supplying a current to light emitting element 32 in the first subframe period. First emitter 27 controls the state of light emitting element 32 by controlling a control signal sent from gate drive circuit 14 to the transistor of pixel circuit 30.

Second emission stopper 25 is a processor that maintains light emitting element 32 in the non-emission state for a predetermined non-emission period in each of the at least one second subframe period. Second emission stopper 25 controls the state of light emitting element 32 by controlling a control signal sent from gate drive circuit 14 to the transistor of pixel circuit 30. Second emission stopper 25 includes third initializer 26.

Third initializer 26 is a processor that applies initialization potential Vini to the source of drive transistor 33 for a predetermined initialization period.

Second emitter 28 is a processor that causes light emitting element 32 to emit light by supplying a current to light emitting element 32 in each of the at least one second subframe period. Second emitter 28 controls the state of light emitting element 32 by controlling a control signal sent from gate drive circuit 14 to the transistor of pixel circuit 30.

[9-5. Control Method]

The control method of display device 801 according to the present embodiment and advantageous effects achieved by this control method are described. The following describes the control method of display device 801 according to the present embodiment, by comparison with a control method of a display device according to a comparison example.

[9-5-1. Control Method of Display Device according to Comparison Example]

First, the control method of the display device according to the comparison example is described. The display device according to the comparison example is identical to display device 801 according to the present embodiment, except for the control method. To be more specific, the display device according to the comparison example is identical to display device 801 according to the present embodiment except for the configuration of a control device.

A waveform of light emitted by the display device according to the comparison example is described with reference to FIG. 30 and FIG. 31. FIG. 31 is a schematic diagram illustrating a waveform of light emitted by the light emitting element included in the display device after insertion of non-emission periods, according to the comparison example. To be more specific, FIG. 31 is a schematic diagram illustrating a waveform of light emitted by the light emitting element according to a subframe drive method. Each of FIG. 30 and FIG. 31 also illustrates a signal writing period (indicated by the broken line) and a non-emission period (indicated by the dotted line).

Figure 30:
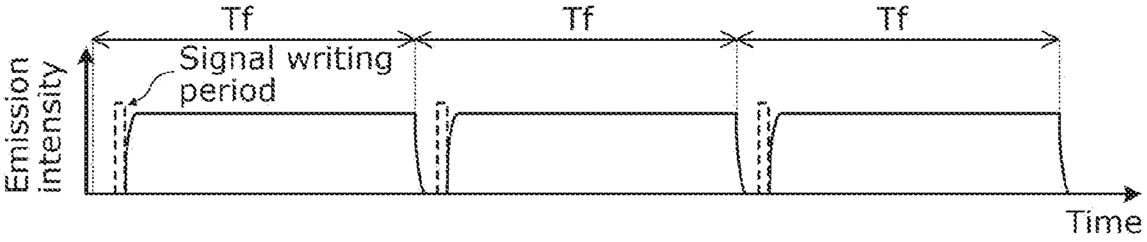
FIG. 30 is a schematic diagram illustrating a waveform of light emitted by a light emitting element included in a display device according to a comparison example.
Figure 31:
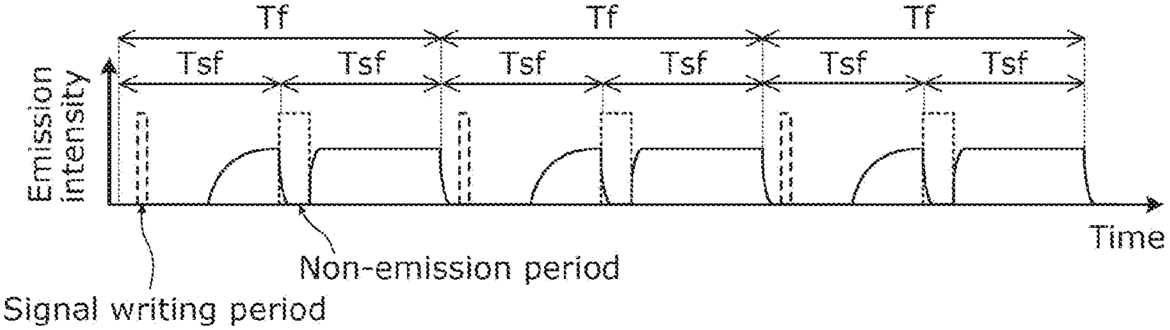
FIG. 31 is a schematic diagram illustrating a waveform of light emitted by the light emitting element included in the display device after insertion of non-emission periods, according to the comparison example.
Figure 32:
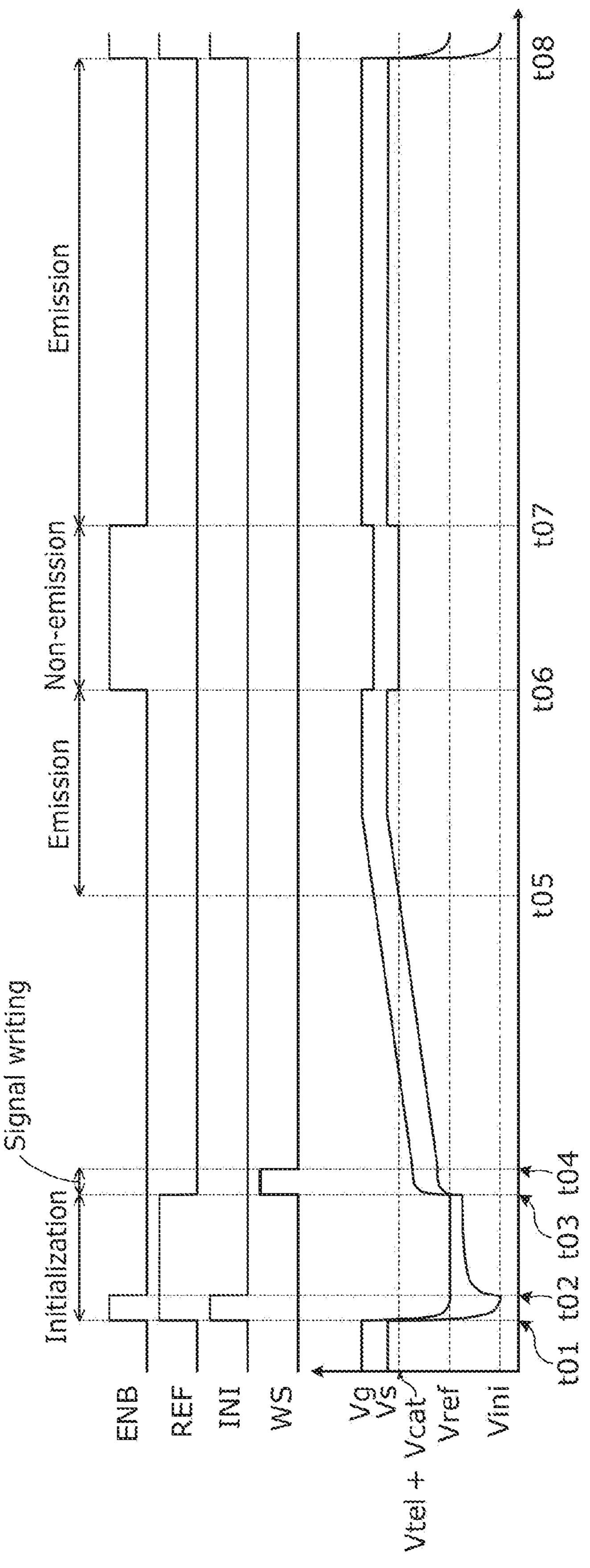
FIG. 32 is a diagram illustrating in detail an operation performed for an HDR video signal by a pixel circuit included in the display device according to the comparison example.

As illustrated in FIG. 30, the light emitting element repeats a frame period (Tf) that includes a non-emission period and an emission period. Thus, a long frame period, or more specifically, a low-frequency frame, results in visible flicker. For example, at a frame frequency of 60 Hz or lower, visible flicker occurs. As a measure to prevent this at a low frame frequency, a non-emission period is inserted into the emission period, as illustrated in FIG. 31. A period from the end of the signal writing period to the start of the emission is longer than a period from the end of the inserted non-emission period to the start of the emission, as illustrated in FIG. 31. Because this period from the end of the signal writing period to the start of the emission occurs every frame period Tf, flicker cannot be fully prevented by the display device according to the comparison example. An operation performed by this display device according to the comparison example is described in detail with reference to FIG. 32. FIG. 32 is a diagram illustrating in detail the operation performed by a pixel circuit included in the display device according to the comparison example.

As illustrated in FIG. 32, an initialization operation is performed from time t01. To be more specific, by controlling gate drive circuit 14 at time t01, control device 820 sets control signal ENB at High level, control signal REF at High level, control signal INI at High level, and control signal WS at Low level. As a result, switch transistor 34 is off, switch transistor 36 is on, switch transistor 37 is on, and selection transistor 35 is off. Hereafter, when control device 820 controls the control signals by controlling gate drive circuit 14 or source drive circuit 16, this is also phrased simply as "control device 820 controls the control signals".

Following this, gate potential Vg of drive transistor 33 changes to reference potential Vref, and source potential Vs of drive transistor 33 changes to initialization potential Vini. Source potential Vs corresponds to the anode potential of light emitting element 32, and the anode potential becomes less than the sum of emission threshold voltage Vtel and cathode potential Vcat (Vtel+Vcat). As a result, light emitting element 32 is maintained in the non-emission state.

After this, control device 820 switches control signal ENB to Low level and control signal INI to Low level, at time t02. As a result, switch transistor 34 is switched on, and switch transistor 37 is switched off. Following this, drive potential Vcc is applied to the drain of drive transistor 33. At this time, gate potential Vg of drive transistor 33 is maintained at reference potential Vref, and the gate-source voltage converges to a voltage corresponding to threshold voltage Vth of drive transistor 33 (this is referred to as the threshold correction operation). This state is maintained until time t03 that follows. A period from time t01 to time t03 is an initialization period.

After this, control signal REF is switched to Low level, and control signal WS is switched to High level, at time t03. As a result, switch transistor 36 is switched off, and selection transistor 35 is switched on. With this, a voltage corresponding to the video signal is applied to pixel capacitance 38 (or more specifically, the gate of drive transistor 33) via scanning line 42. In this way, the video signal is written into pixel capacitance 38 of pixel circuit 30.

As a result of the application of the voltage corresponding to the video signal to pixel capacitance 38, gate potential Vg rises in response to this voltage. Following this, source potential Vs also rises, and the voltage across pixel capacitance 38 reaches a voltage corresponding to the video signal. This state is maintained until time t04 that follows. A period from time t03 to time t04 is a signal writing period.

After this, control signal WS is switched to Low level at time 04. As a result, selection transistor 35 is switched off. Following this, a current corresponding to the gate-source voltage passes through drive transistor 33. Here, EL capacitance 39 of light emitting element 32 is first charged by drive transistor 33. Next, a bootstrapping operation is performed to raise the anode potential of light emitting element 32, that is, source potential Vs of drive transistor 33. Then, at time t05, source potential Vs of drive transistor 33 reaches emission threshold voltage Vtel of light emitting element 32 or higher, thereby causing light emitting element 32 to start emission.

By this bootstrapping operation, a rise rate of source potential Vs (that is, a slope of a curve indicating source potential Vs in FIG. 32) decreases with decrease of the gate-source voltage, that is, with decrease in dynamic range of the video signal.

Thus, source potential Vs takes more time to rise to emission threshold voltage Vtel for the LDR video signal than for the HDR video signal, as illustrated in FIG. 32.

More specifically, a period from the end of the signal writing period (time t04) to the start of the emission (time t05) is longer.

After this, control signal ENB is switched to High level at time t06, as illustrated in FIG. 32. As a result, switch transistor 34 is turned off, and the current supply from drive transistor 33 to light emitting element 32 is thereby stopped. Following this, light emitting element 32 is maintained in the non-emission state. This state is maintained until time t07 that follows. A period from time t06 to time t07 is a non-emission period.

After this, control signal ENB is switched back to Low level at time t07. As a result, the current supply to light emitting element 32 is resumed, and the emission is thereby resumed by light emitting element 32. Here, a period from time t07 to the start of the emission by light emitting element 32 is independent of the dynamic range level of the video signal. The emission by light emitting element 32 starts immediately after time t07.

After this, the initialization operation is performed at time t08 as performed at time t01.

As described above, the control method of the display device according to the comparison example causes the non-emission period from time t01 to time t05 to be significantly longer than the non-emission period from time t06 to time t07, especially for the LDR video signal. More specifically, the display device according to the comparison example causes the long non-emission period from time t01 to time t05 every frame period. Thus, this control method fails to prevent flicker.

[9-5-2. Control Method of Display Device according to Present Embodiment]

Figure 33:
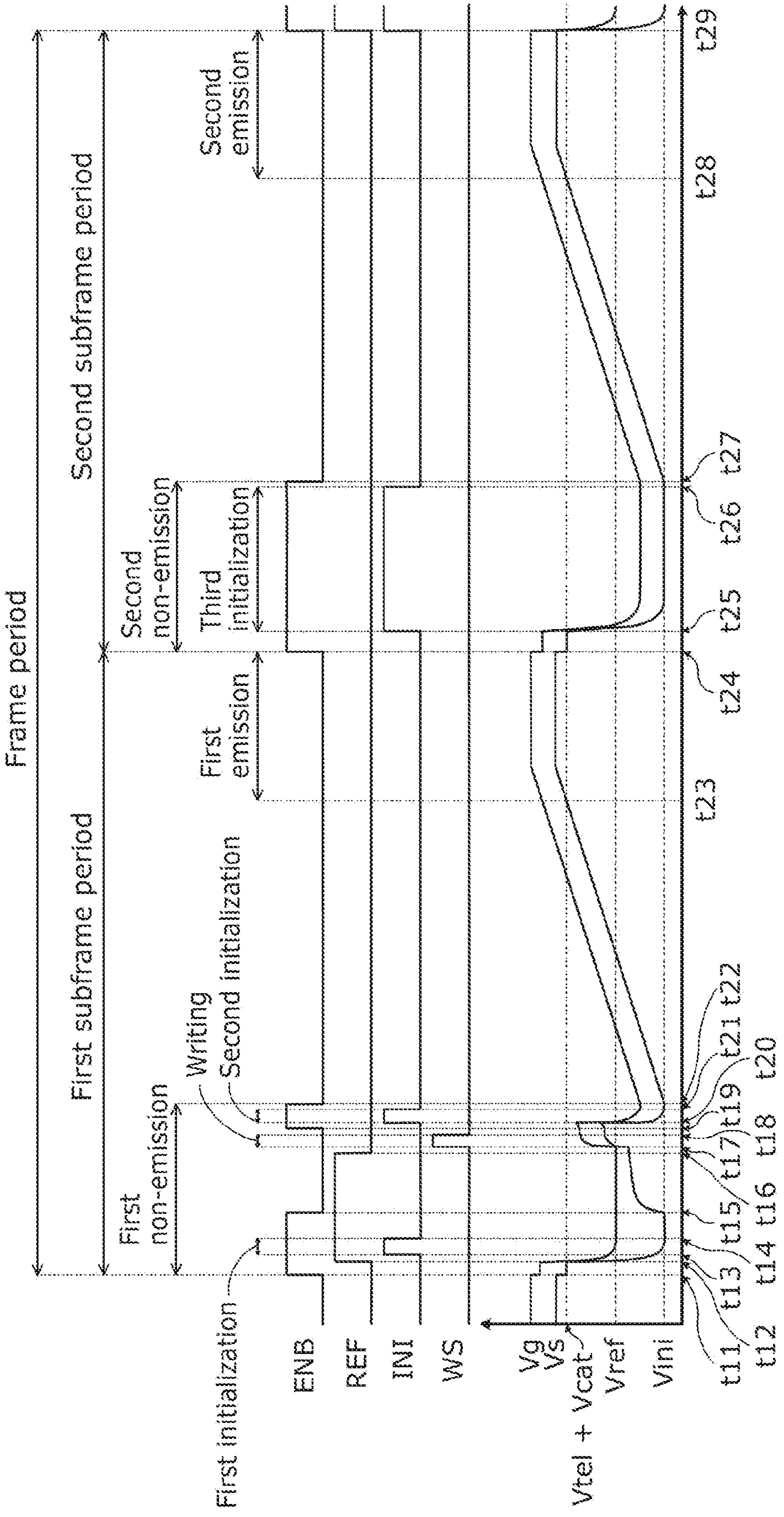
FIG. 33 is a diagram illustrating in detail an operation of the pixel circuit included in the display device according to Embodiment 9.

The control method of display device 801 according to the present embodiment is described with reference to FIG. 33. FIG. 33 is a diagram illustrating in detail an operation of pixel circuit 30 included in display device 801 according to the present embodiment.

By the control method of display device 801 according to the present embodiment as illustrated in FIG. 33, a frame period during which one image continues to be displayed includes a first subframe period and at least one second subframe period that follows the first subframe period. In the example illustrated in FIG. 33, the frame period includes a single second subframe period. The first subframe period is from time t11 to time t24 and the second subframe period is from time t24 to time t29.

In the example illustrated in FIG. 33, control device 820 sets control signal ENB at High level, control signal REF at Low level, control signal INI at Low level, and control signal WS at Low level, at time t11, as in the comparison example. As a result, the off-state of switch transistor 34 stops the current supply to drive transistor 33 and light emitting element 32 (this process is referred to as the first non-emission step or step (H)). The current supply to light emitting element 32 is stopped for a predetermined non-emission period. In the present embodiment, the non-emission period is from time t11 to time t22. Following this, light emitting element 32 in the emission state is switched into the non-emission state.

After this, display device 820 switches control signal REF to High level at time t12. As a result, the maintained on-state of switch transistor 36 enables the application of reference voltage Vref to the gate of drive transistor 33.

After this, display device 820 switches control signal INI to High level at time t13. As a result, the maintained on-state of switch transistor 37 enables the application of initialization potential Vini to the source of drive transistor 33 (this process is referred to as the first initialization step or step (L)).

After this, control device 820 switches control signal INI to Low level at time t14. As a result, the maintained off-state of switch transistor 37 stops the application of initialization Vini to the source of drive transistor 33.

After this, display device 820 switches control signal ENB to Low level at time t15. As a result, the on-state of switch transistor 34 enables the current supply to drive transistor 33 and light emitting element 32. Following this, the gate-source voltage of drive transistor 33 converges to a voltage corresponding to threshold voltage Vth of drive transistor 33, as with the control method of the display device according to the comparison example.

After this, display device 820 switches control signal REF to Low level at time t16. As a result, the off-state of switch transistor 36 stops the application of reference potential Vref to the gate of drive transistor 33.

After this, control device 820 switches control signal WS to High level at time t17. As a result, selection transistor 35 is switched on. This allows the signal corresponding to the image displayed in the present frame period (that is, the signal corresponding to the video signal) to be applied to pixel capacitance 38 (or more specifically, the gate of drive transistor 33) via signal line 42 (this process is referred to as the writing step or step (M)). Following this, the potential of the gate of drive transistor 33 rises according to the video signal.

After this, control device 820 switches control signal WS to Low level at time t18. As a result, selection transistor 35 is switched off. Following this, the application of the signal corresponding to the image to pixel capacitance 38 is stopped.

After this, control device 820 switches control signal ENB to High level at time t19. As a result, the off-state of switch transistor 34 stops the current supply to drive transistor 33 and light emitting element 32.

After this, control device 820 switches control signal INI to High level at time t20. As a result, the maintained on-state of switch transistor 37 enables the application of initialization potential Vini to the source of drive transistor 33 (this process is referred to as the second initialization step or step (N)). Following this, source potential Vs reaches initialization potential Vini, and gate potential Vg varies according to source potential Vs while keeping the gate-source voltage constant.

After this, control device 820 switches control signal INI to Low level. As a result, switch transistor 37 is switched off. Following this, the application of initialization potential Vini to the source of drive transistor 33 is stopped.

After this, control device 820 switches control signal ENB to Low level, at time t22. Following this, a current corresponding to the gate-source voltage passes through drive transistor 33. Thus, source potential Vs rises as a result of the bootstrapping operation, as in the comparison example. Then, source potential Vs reaches emission threshold voltage Vtel of light emitting element 32 or higher, thereby causing light emitting element 32 to start emission at time t23 (this process is referred to as the first emission step or step (I)). This emission continues until time t24 at which the first subframe period ends.

After this, control signal ENB is switched to High level at time t24 at which the second subframe period starts. As a result, switch transistor 34 is off, and the current supply from drive transistor 33 to light emitting element 32 is thereby stopped. Following this, light emitting element 32 is maintained in the non-emission state (this process is referred to as the second non-emission step or step (J)). The current supply to light emitting element 32 is stopped for the non-emission period as in the first non-emission step. In the present embodiment, the non-emission period is from time t24 to time t27.

After this, control device 820 switches control signal INI to High level at time t25, as in the operation at time t20. As a result, initialization potential Vini is applied to the source of drive transistor 33 (this process is referred to as the third initialization step or step (O)). Following this, source potential Vs reaches initialization potential Vini, and gate potential Vg varies according to source potential Vs while keeping the gate-source voltage constant.

After this, control device 820 switches control signal INI to Low level at time 26, as in the operation at time t21. As a result, switch transistor 37 is switched off.

After this, control device 820 switches control signal ENB to Low level at time t27, as in the operation at time t22. As a result, a current corresponding to the gate-source voltage passes through drive transistor 33. Following this, source potential Vs rises as a result of the bootstrapping operation. Then, source potential Vs reaches at least the sum of emission threshold voltage Vtel of light emitting element 32 and cathode potential Vcat (Vtel+Vcat), thereby allowing light emitting element 32 to start emission at time t28 (this process is referred to as the second emission step or step (K)). This emission continues until time t29 at which the second subframe period ends.

Figure 34:
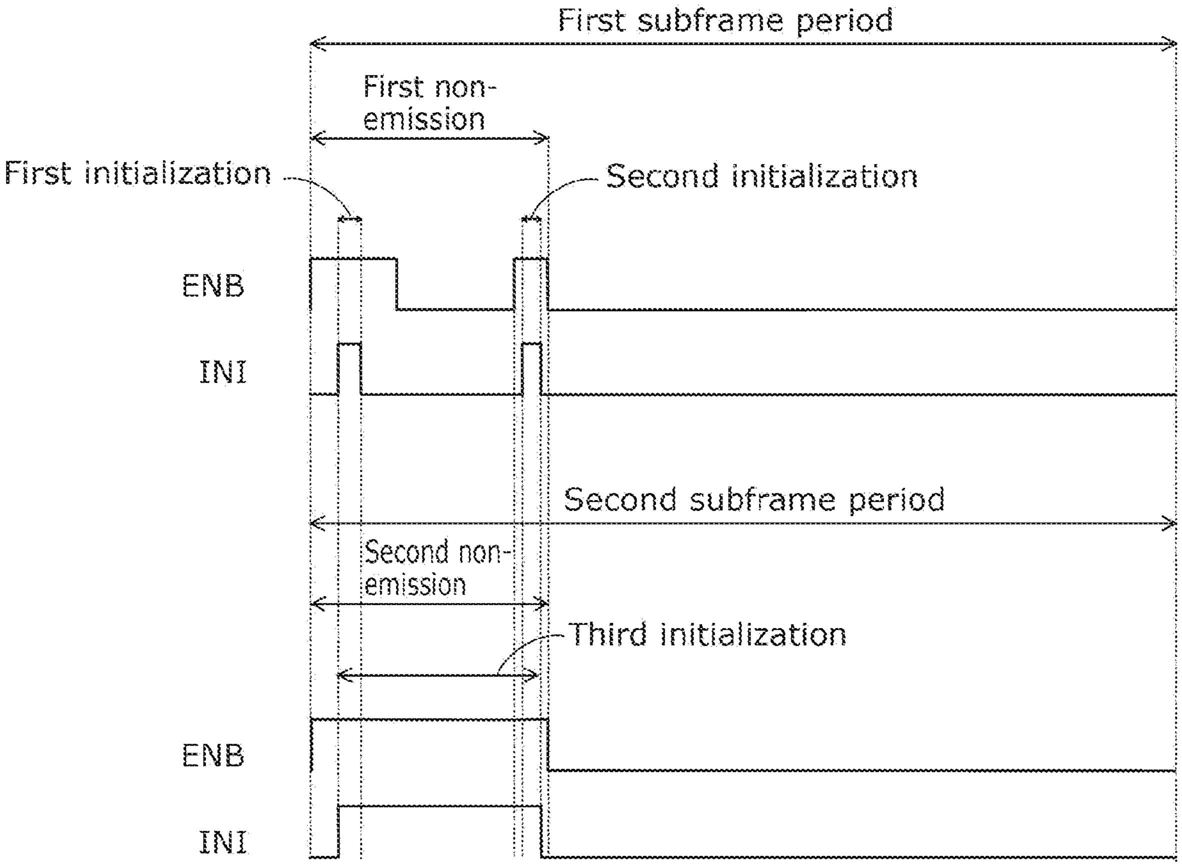
FIG. 34 is a timing chart illustrating states of control signal ENB and control signal INI in a first subframe period and a second subframe period, according to Embodiment 9.

Here, timings of the non-emission period and the initialization period in the first subframe period and in the second subframe period are described with reference to FIG. 34. FIG. 34 is a timing chart illustrating the states of control signal ENB and control signal INI in the first subframe period and in the second subframe period, according to the present embodiment. In FIG. 34, the timing charts of the first subframe period and the second subframe period are arranged vertically.

As illustrated in FIG. 34, the second subframe period is equal in length to the first subframe period. Furthermore, the non-emission period in the first subframe period (that is, in the first non-emission step) is equal in length to the non-emission period in the second subframe period (that is, in the second non-emission step).

Furthermore, the period from the start of the first subframe period (from time t11 in FIG. 33) to the end of the second initialization step (to time t21 in FIG. 33) is equal in length to the period from the start of the second subframe period (from time t24 in FIG. 33) to the end of the third initialization step (to time t26 in FIG. 33).

Furthermore, in the present embodiment, the period from the start of the first subframe period (from time t11 in FIG. 33) to the start of the first initialization step (to time t13 in FIG. 33) is equal in length to the period from the start of the second subframe period (from time t24 in FIG. 33) to the start of the third initialization step (to time t25 in FIG. 33).

As described above, the control method of display device 801 according to the present embodiment includes, in the first subframe period: (H) maintaining light emitting element 32 in a non-emission state for a non-emission period that is predetermined; and (I) causing light emitting element 32 to emit light after step (H). Furthermore, the control method of display device 801 according to the present embodiment includes, in each of the at least one second subframe period: (J) maintaining light emitting element 32 in the non-emission state for the non-emission period; and (K) causing light emitting element 32 to emit light after step (J). Step (H) includes: (L) applying initialization potential Vini, which is predetermined, to the source of drive transistor 33; (M) writing a signal corresponding to the one image displayed in the preset frame period to the pixel capacitance after step (L); and (N) applying initialization potential Vini to the source of drive transistor 33 for an initialization period, after step (M). Step (J) includes (O) applying initialization potential Vini to the source of drive transistor 33.

In this way, source potential Vs of drive transistor 33 is initialized after the writing step in the first subframe period and in the second subframe period. With this, source potential Vs of drive transistor 33 can be at initialization potential Vini immediately after the second initialization step in the first subframe period and immediately after the third initialization step in the second subframe period. Thus, the times taken for source potential Vs to rise to the sum of emission threshold voltage Vtel and cathode potential Vcat as a result of the bootstrapping operations can be the same in the first subframe period and the second subframe period. In other words, a time lag between the emission start timings in the first subframe period and the second subframe period can be reduced. Hence, display device 801 according to the present embodiment can prevent flicker from occurring, as compared with the display device according to the comparison example.

Furthermore, in the present embodiment, the first subframe period is equal in length to the second subframe period, and the period from the start of the first subframe period to the end of the second initialization step is equal in length to the period from the start of the second subframe period to the end of the third initialization step. With this, the time lag between the emission start timings in the first subframe period and the second subframe period can be further reduced. Moreover, the period from the end of the second initialization step to the end of the first subframe period can be made equal in length to the period from the end of the third initialization step to the end of the second subframe period. This allows the emission period in the first subframe period to be equal in length to the emission period in the second subframe period. Hence, display device 801 according to the present embodiment can further prevent flicker from occurring.

As described above, the control method of display device 802 according to the present embodiment includes the second initialization step and the third initialization step and thereby enabling source potential Vs of drive transistor 33 to be at initialization potential Vini. In reality, however, the potential of power line 44 applied with initialization potential Vini varies. To be more specific, a voltage drop of power line 44 causes variations in potential of power line 44. The voltage drop of power line 44 increases with increase in wiring length from power circuit 18 to pixel circuit 30.

To initialize source potential Vs of drive transistor 33 to initialization potential Vini, switch transistor 37 is maintained in the on-state and then the electrical charge of EL capacitance 39 is discharged via power line 44 applied with initialization potential Vini. This operation is performed substantially at the same time in the plurality of pixel circuits 30 connected to the same scanning line 40. Although depending on the screen size, the total amount of electrical charge of EL capacitance 39 is substantially not less than 0.1 μF and not more than several tens of μF. Even if a change in source potential Vs of drive transistor 33 between before and after the initialization is 10 V or less, the discharge current can reach nearly 100 mV immediately after the start of the initialization. Power line 44 may be able to temporarily accumulate the discharge current from pixel circuit 30 by utilizing parasitic capacity of power line 44 itself (capacity between one-half and twice the capacity of EL capacitance 39). Even in this case, about several hundred mV of the voltage drop is caused by resistance of power line 44 carrying the discharge current.

In the present embodiment, switch transistor 37 that controls the application of initialization potential Vini is directly connected to the source of drive transistor 33. Especially in this case, a more amount of electric charge is discharged into power line 44 in the initialization step as compared with the case where switch transistor 37 is connected to the drain of drive transistor 33. Thus, the variations in potential further increase.

Figure 35:
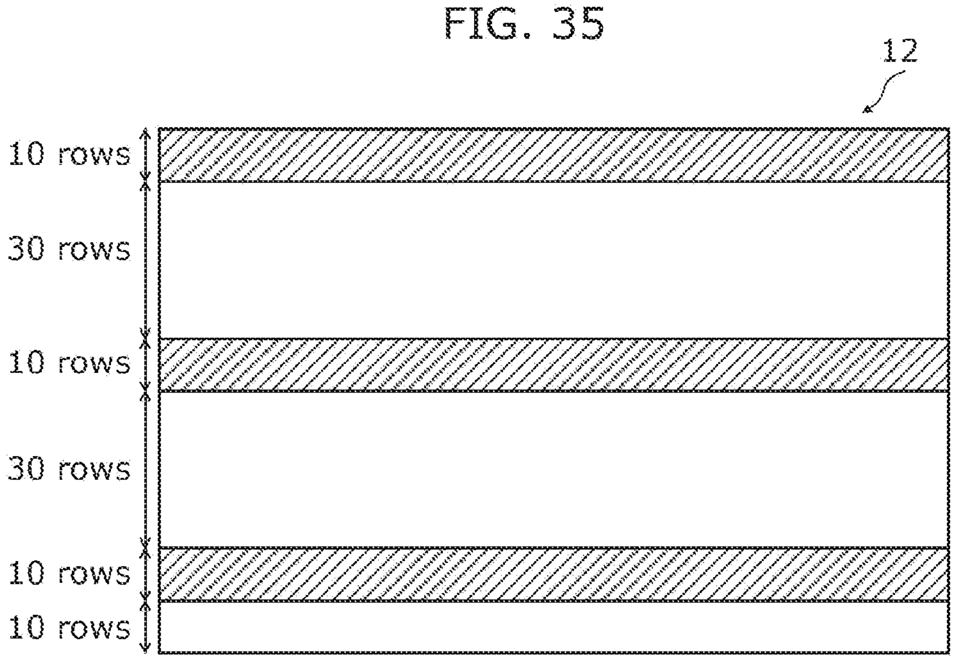
FIG. 35 is a first schematic diagram illustrating positions of rows to be initialized in a display section of the display device according to Embodiment 9.
Figure 36:
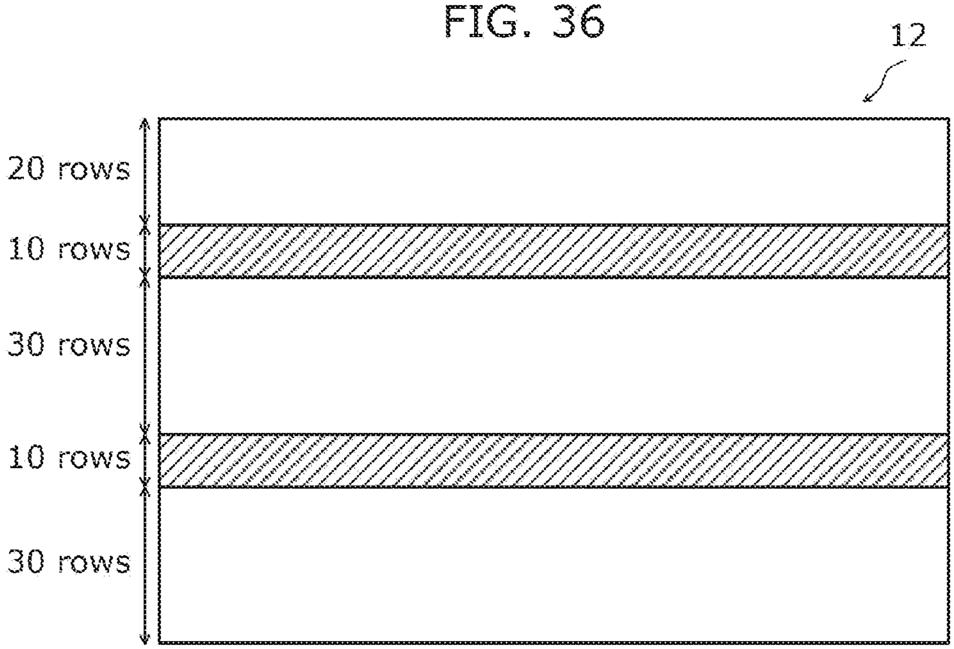
FIG. 36 is a second schematic diagram illustrating positions of rows to be initialized in the display section of the display device according to Embodiment 9.
Figure 37:
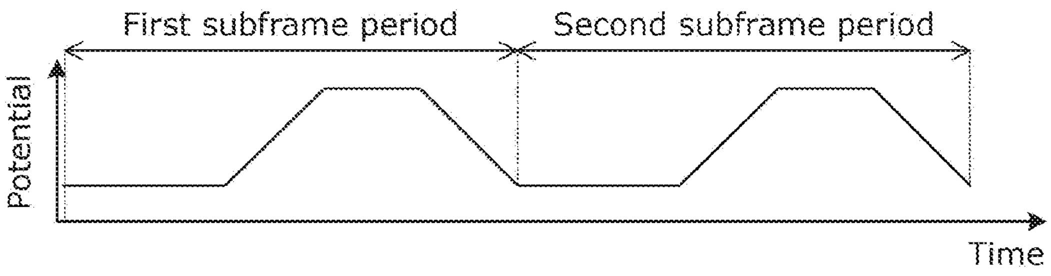
FIG. 37 is a schematic diagram illustrating a time waveform of the potential of a power line applied with an initialization potential in the display device according to Embodiment 9.

Furthermore, the amount of change in the potential of power line 44 varies in the frame period, according to the number of pixel circuits 30 to be initialized (or more specifically, the number of rows of pixel circuits 30 to be initialized among the plurality of pixel circuits 30 arranged in the matrix). The potential variations of power line 44 applied with initialization potential Vini are described with reference to FIG. 35 to FIG. 37. FIG. 35 is a first schematic diagram illustrating positions of rows to be initialized in display section 12 of display device 801 according to the present embodiment. FIG. 36 is a second schematic diagram illustrating positions of rows to be initialized in display section 12 of display device 801 according to the present embodiment. FIG. 37 is a schematic diagram illustrating a time waveform of the potential of power line 44 applied with initialization potential Vini in display device 801 according to Embodiment 9.

In each of examples illustrated in FIG. 35 and FIG. 36, the number of lines included in one frame (that is, the number of horizontal synchronization signals included in one frame) is 120, and the number of rows of pixel circuits 30 arranged in the matrix in display section 12 (that is, the number of rows to be displayed on display panel 10) is 100. Furthermore, in the examples in FIG. 35 and FIG. 36, the light emission duty is 75% and one subframe period corresponds to 40 horizontal scanning periods. To be more specific, 10 rows of pixel circuits 30 among 40 rows of pixel circuits 30 are maintained in the non-emission state. In FIG. 35 and FIG. 36, the rows maintained in the non-emission state are hatched. FIG. 36 illustrates the state of display section 12 after 20 horizontal scanning periods corresponding to the timing illustrated in FIG. 35.

As illustrated in FIG. 35 and FIG. 36, the number of rows to be maintained in the non-emission state is different depending on the timing in the frame period. At the timing illustrated in FIG. 35, 30 rows of pixel circuits 30 are maintained in the non-emission state. At the timing illustrated in FIG. 36, 20 rows of pixel circuits 30 are maintained in the non-emission state. More specifically, the number of rows to be initialized is different depending on the timing in the frame period. On this account, the amount of electric discharge into power line 44 applied with initialization potential Vini from the source of drive transistor 33 varies according to the timing in the frame period. Thus, the potential of power line 44 applied with initialization potential Vini varies according to the timing in the subframe period, as illustrated in FIG. 37.

In accordance with the potential variations of power line 44 as illustrated in FIG. 37, source potential Vs of drive transistor 33 to be initialized varies according to the timing of initialization. Thus, the change in source potential Vs before the bootstrapping operation increases, thereby increasing the time lag between the emission timings of light emitting element 32 in the subframe periods. As a result, the brightness of light emitting element 32 varies according to the potential variations of power line 44. More specifically, the brightness of the image displayed by display section 12 is uneven.

In the present embodiment, the period from the start of the first subframe period to the end of the second initialization step is equal in length to the period from the start of the second subframe period to the end of the third initialization step, as described above. Thus, the initialization steps end at the same timing in the subframe periods. Here, as illustrated in FIG. 37, the potential of power line 44 varies in the same cycle as the subframe period. Thus, by ending the initialization steps at the same timing in the subframe periods, source potential Vs of drive transistor 33 can be made the same at the ends of the initialization steps in the subframe periods. As a result, the time lag between the emission start timings in the first subframe period and the second subframe period can be reduced. Hence, the variations in brightness of the image displayed by display section 12 can be reduced.

Furthermore, in the present embodiment, the first initialization step starts after the start of the first non-emission step, and the third initialization step starts after the start of the second non-emission step, as illustrated in FIG. 33. To be more specific, first initializer 22 of control device 820 starts the application of initialization potential Vini after first emission stopper 21 stops the current supply to light emitting element 32. Then, third initializer 26 starts the application of initialization potential Vini after second emission stopper 25 stops the current supply to light emitting element 32.

In this way, the initialization step is performed after the start of the first non-emission step and after the start of the second non-emission step. This can reduce source potential Vs of drive transistor 33 at the start of the initialization step. Thus, the amount of electric discharge into power line 44 can be reduced by the amount of electric charge corresponding to this potential reduction. As a result, the potential variations of power lien 44 can be reduced.

Furthermore, the period from the start of the first subframe period (from time t11 in FIG. 33) to the start of the first initialization step (to time t13 in FIG. 33) is equal in length to the period from the start of each of the at least one second subframe period (from time t24 in FIG. 33) to the start of the third initialization step (to time t25 in FIG. 33). To be more specific, the period from the start of the first subframe period to the start of the application of initialization potential Vini by first initializer 22 is equal in length to the period from the start of each of the at least one second subframe period to the start of the application of initialization potential Vini by third initializer 26. This allows the amounts of reduction in source potential Vs of drive transistor 33 in the non-emission steps to be the same. Thus, source potential Vs of drive transistor 33 can be made the same at the starts of the initialization steps. As a result, the amounts of change in potential of power line 44 applied with initialization potential Vini can be made the same in the subframe periods.

The length of the period from the start of the first subframe period to the start of the first initialization step and the length of the period from the start of each of the at least one second subframe period to the start of the third initialization step each may be at least one horizontal scanning period, for example. Alternatively, each of these lengths may be at least five horizontal scanning periods or at least nine horizontal scanning periods, for example. By increasing these lengths, source potential Vs of drive transistor 33 in the non-emission steps can be sufficiently reduced.

Furthermore, in the present embodiment, in step (O), initialization potential Vini is continuously applied to the source of transmitted 33 from the start of step (O) to the end of step (O). To be more specific, third initializer 26 continues applying initialization potential Vini in the non-emission period, from the start of the application of initialization potential Vini to the end of the application of initialization potential Vini.

With this, a difference between source potential Vs of drive transistor 33 at the end of the third initialization step and the potential of power line 44 applied with initialization potential Vini can be reduced. To be more specific, source potential Vs of drive transistor 33 can be reliably initialized.

The operation of initializing source potential Vs of drive transistor 33 in the present embodiment includes the first initialization step to the third initialization step. In the first initialization step among these initialization steps, a potential needed for the threshold correction operation subsequently performed on drive transistor 33 is applied to the source of drive transistor 33. On this account, the variation range of source potential Vs is not as wide as in the other initialization steps. Source potential Vs of drive transistor 33 only has to be Vref−Vth after the threshold correction operation. Furthermore, the second initialization step is performed immediately after the video signal writing. In the second initialization step, source potential Vs raised from Vref−Vth by voltage a corresponding to the video signal is initialized. On this account, a potential difference between before and after the initialization is relatively small. Thus, the second initialization step can be performed relatively easily. Here, although depending on the capacity sizes of pixel capacitance 38 and EL capacitance 39, voltage a corresponding to the video signal is substantially not less than 10% and not more than 60% of a difference between a voltage corresponding to the video signal of the peak brightness and reference potential Vref.

In contrast, in the third initialization step, source potential Vs of drive transistor 33 before the initialization is, when at its highest, at a potential reduced from the sum of the voltage applied to light emitting element 32 for the peak brightness and the cathode potential Vcat by a potential drop before the initialization in the second non-emission step. Immediately before the third initialization step, source potential Vs of drive transistor 33 is Vtel+Vcat even after the completion of the discharge of EL capacitance 39 after the start of the second non-emission period. For this reason, source potential Vs needs to be reduced from the potential of at least Vtel+Vcat down to initialization potential Vini in the third initialization step.

Here, a relationship between source potential Vs immediately before the second initialization step (=Vref−Vth+α) and the sum of emission threshold voltage Vtel and cathode potential Vcat can be expressed by the following inequality.

$$Vref-Vth+\alpha<Vtel+Vcat$$

Thus, source potential Vs immediately before the third initialization step (=Vtel+Vcat) is higher than source potential Vs immediately before the second initialization step (<Vtel+Vcat).

As described, the variation range of source potential Vs is wider in the third initialization step than in the second initialization step.

In the second initialization step and the third initialization step, the source of drive transistor 33 is applied with the reference potential used before light emitting element 32 is switched from the non-emission state into the emission state, as described above. Then, the length of the emission period varies according to the variations of this potential, which can result in flicker. The variation range is wider in the third initialization step than in the second initialization step. For this reason, initialization potential Vini is to be continuously applied to the source of drive transistor 33 as long as possible. Such a potential application is effective in improving flicker.

In the present embodiment, initialization is performed on a plurality of consecutive rows, as illustrated in FIG. 35 and FIG. 36. More specifically, the sources of drive transistors 33 included in pixel circuits 30 of the plurality of rows are simultaneously connected to power line 44 applied with initialization Vini.

More specifically, when the initialization of the source of drive transistor 33 of one pixel circuit 30 is started, the initialization of the source of drive transistor 33 of pixel circuit 30 located below the one pixel circuit 30 (in the vertically downward direction in FIG. 35 and FIG. 36) has already started. Thus, the source of this pixel circuit 30 located below is maintained at, or nearly at, initialization potential Vini. As a result, the source of one pixel circuit 30 to be initialized discharges not only to power circuit 18 via power line 44, but also to the source of drive transistor 33 of pixel circuit 30 located below. In this way, the source of drive transistor 33 discharges not only to power circuit 18, but also to the source of drive transistor 33 of pixel circuit 30 located below. This can reduce the potential variations of power line 44.

In the above example, the scanning is performed in display panel 10 in a direction from top to bottom as viewed in FIG. 35 and FIG. 36. However, the scanning direction of display panel 10 is not limited to this. The scanning may be performed in a direction from bottom to top. In this case, when the initialization of the source of drive transistor 33 of one pixel circuit 30 is started, the initialization of the source of drive transistor 33 of pixel circuit 30 located above the one pixel circuit 30 (in the vertically upward direction in FIG. 35 and FIG. 36) has already started.

In this way, the source of drive transistor 33 of one pixel circuit to be initialized discharges to the source of drive transistor 33 of another pixel circuit 30 for which the initialization has already started, in the present embodiment. By taking advantage of this, the potential variations of power line 44 can be reduced.

The initialization period in the third initialization step may have a length that is at least 50% of the length of the non-emission period. This enables the electric discharge via power line 44 over a long time. In addition, the charge transfer from EL capacitance 39 connected to the source of drive transistor 33 of pixel circuit 30 that starts the third initialization step earlier than present pixel circuit 30 can be used. This allows the source of drive transistor 33 to be reliably initialized. Furthermore, the length of the initialization period in the third initialization step may be at least 75% of the length of the non-emission period. This allows the source of drive transistor 33 to be more reliably initialized.

Embodiment 10

A display device and a control method of the display device according to Embodiment 10 are described. The display device according to the present embodiment is different from display device 801 according to Embodiment 9 in that a dummy pixel circuit is included. The following mainly describes differences between: the display device and the control method of the display device according to the present embodiment; and those according to Embodiment 9.

Figure 38:
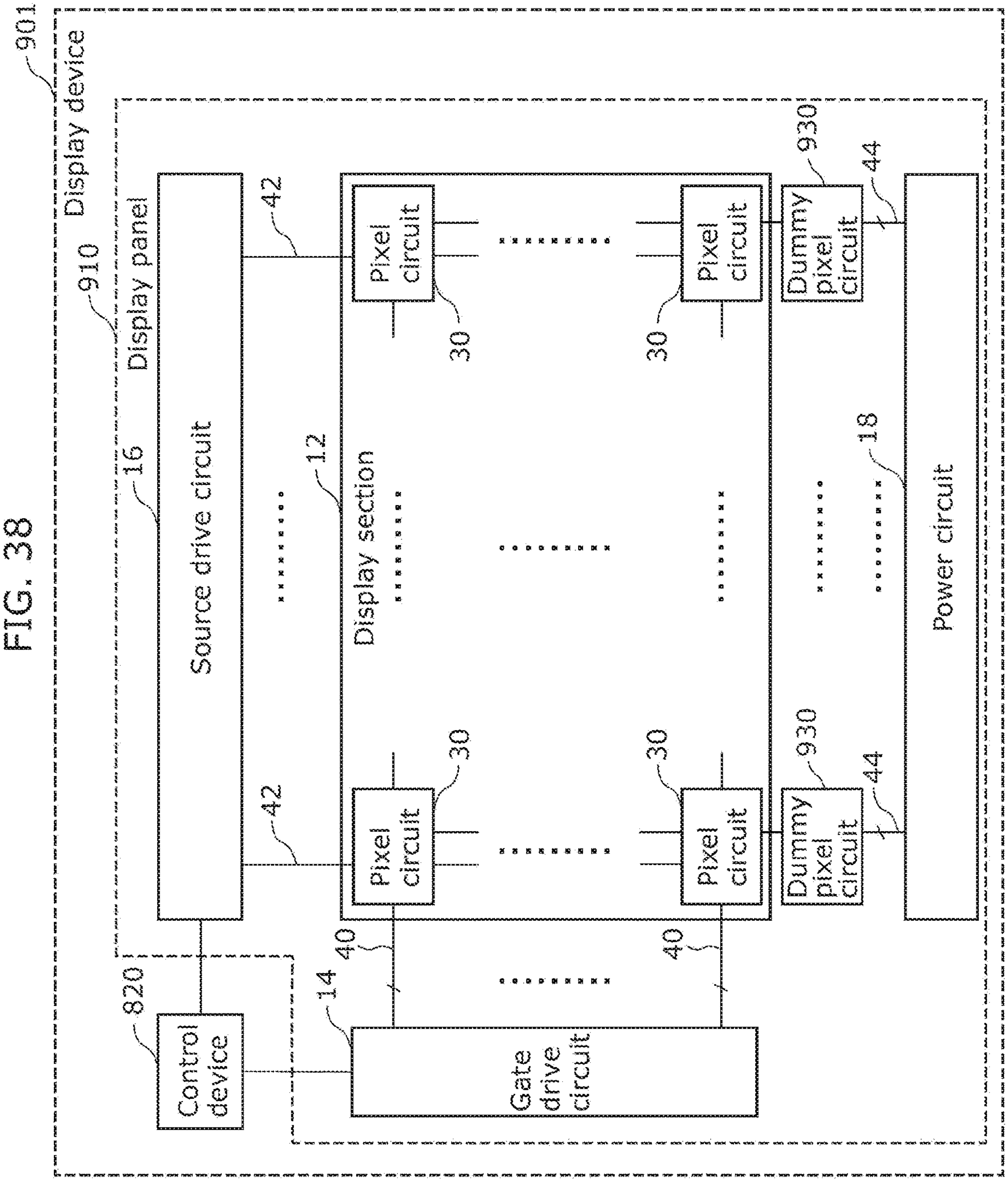
FIG. 38 is a schematic diagram illustrating an example of a configuration of a display device according to Embodiment 10.
Figure 39:
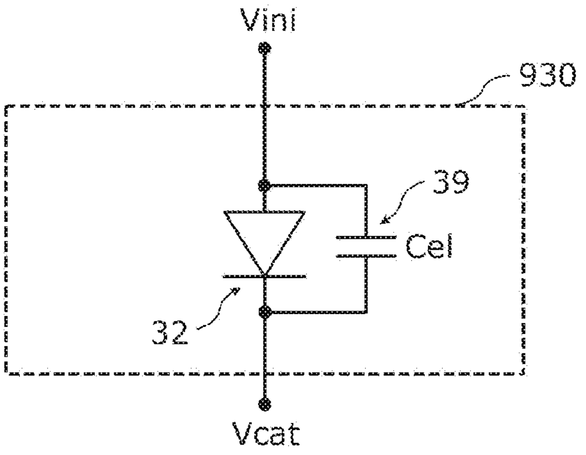
FIG. 39 is a schematic circuit diagram illustrating an example of a configuration of a dummy pixel circuit according to Embodiment 10.

A configuration of the display device according to the present embodiment is described with reference to FIG. 38. FIG. 38 is a schematic diagram illustrating an example of a configuration of display device 901 according to the present embodiment. As illustrated in FIG. 38, display device 901 includes display panel 910 and control device 820. Display panel 910 includes display section 12, gate drive circuit 14, source drive circuit 16, and power circuit 18. In the present embodiment, display panel 910 further includes at least one dummy pixel circuit 930. Here, an example of a circuit configuration of dummy pixel circuit 930 is described with reference to FIG. 39. FIG. 39 is a schematic circuit diagram illustrating the example of the configuration of dummy pixel circuit 930 according to the present embodiment.

As illustrated in FIG. 39, dummy pixel circuit 930 includes light emitting element 32 that has the same configuration as light emitting element 32 included in pixel circuit 30. Thus, dummy pixel circuit 930 and pixel circuit 30 can be made at the same time. This simplifies the manufacturing process of display device 901. As described above, light emitting element 32 includes EL capacitance 39. Light emitting element 32 included in dummy pixel circuit 930 is an example of a capacitive element included in dummy pixel circuit 930. An anode of light emitting element 32 is applied with initialization potential Vini via power line 44.

Control device 820 according to the present embodiment includes third initializer 26 as an initializer that applies initialization potential Vini to the source of drive transistor 33 included in at least one pixel circuit 30 among the plurality of pixel circuits 30 and to the capacitive element (light emitting element 32 in the present embodiment) included in each of the at least one dummy pixel circuit. More specifically, in the third initialization step, initialization potential Vini is applied to the source of drive transistor 33 included in at least one pixel circuit 30 among the plurality of pixel circuits 30 and to the capacitive element included in each of the at least one dummy pixel circuit 930. In this way, not only the source of drive transistor 33 of pixel circuit 30 but also light emitting element 32 of dummy pixel circuit 930 is initialized in the present embodiment. Note that light emitting element 32 of dummy pixel circuit 930 is applied with initialization Vini at all times. This allows light emitting element 32 of dummy pixel circuit 930 to be already initialized when the initialization of the source of drive transistor 33 of one pixel circuit 30 is started. As a result, the source of pixel circuit 30 to be initialized discharges not only to power circuit 18 via power line 44, but also to light emitting element 32 of dummy pixel circuit 930. In this way, the source of drive transistor 33 discharges not only to power circuit 18, but also to light emitting element 32 of dummy pixel circuit 930. This can reduce the potential variations of power line 44.

Note that light emitting element 32 of dummy pixel circuit 930 may be blue light emitting element 32, for example. The film thickness between the anode and the cathode of blue light emitting element 32 is usually smaller than the film thickness between the anode and the cathode of red or green light emitting element 32. Thus, if dummy pixel circuit 930 includes blue light emitting element 32, the capacity of light emitting element 32 (EL capacitance) is larger as compared with the case where dummy pixel circuit 930 includes red or green light emitting element 32.

Furthermore, the configuration of dummy pixel circuit 930 is not limited to the example illustrated in FIG. 39. Dummy pixel circuit 930 only has to include a capacitive element. For example, this capacitive element may include an anode and a cathode identical to those of light emitting element 32 and have only the thinnest film of the films between the anode and the cathode of light emitting element 32. In this case, the capacity of the capacitive element of dummy pixel circuit 930 can be increased without complicating the manufacturing process.

Furthermore, dummy pixel circuit 930 may be a capacitive element. In other words, dummy pixel circuit 930 need not include any component other than the capacitive element.

Furthermore, dummy pixel circuit 930 may have the same configuration as pixel circuit 30. In this case, switch transistor 37 that controls the application of initialization potential Vini may be in the on-state at all times.

Furthermore, dummy pixel circuit 930 may be disposed outside display section 12 in the vertical direction (that is, the top-bottom direction in FIG. 38). Alternatively, dummy pixel circuit 930 may be disposed outside display section 12 in the horizontal direction (that is, the right-left direction in FIG. 38). Moreover, dummy pixel circuit 930 may be disposed near an inner edge of display section 12.

Other Embodiments

Although the display device and the control method of the display device according to the present disclosure have been described by way of Embodiments above, it should be obvious that the display device and the control method of the display device according to the present disclosure are not limited to Embodiments described above. Other embodiments implemented through various changes and modifications conceived by those skilled in the art may be included within the scope of the present disclosure, unless such changes and modifications depart from the scope of the present disclosure.

For example, the control method of the display device according to each of Embodiment 1 to Embodiment 8 includes the third initialization step immediately after the period following the writing step. However, the third initialization step need not be included. The effect of reducing flicker can be achieved without the third initialization step.

Furthermore, the second initialization potential used by the control method of the display device according to each of Embodiment 1 to Embodiment 8 may be not less than the minimum value and not more than the maximum value of the potential of the source of drive transistor 33 immediately after the writing step. The second initialization potential set in this way is effective especially if the control method of the display device does not include the third initialization step. More specifically, the second initialization potential set in this way can reduce a difference between source potential Vs of drive transistor 33 immediately after the writing step in the first subframe period and source potential Vs of drive transistor 33 immediately after the second initialization step in the second subframe period. Thus, a difference in length of the emission period between the first subframe period and the second subframe period can be reduced. This can further reduce flicker.

Furthermore, the second initialization potential may be an average value of the potential of the source of drive transistor 33 immediately after the writing step. With this, a difference between source potential Vs of drive transistor 33 immediately after the writing step in the first subframe period and source potential Vs of drive transistor 33 immediately after the second initialization step in the second subframe period can be further reduced.

Furthermore, in each of Embodiment 9 and Embodiment 10, initialization potential Vini is continuously applied in the third initialization step. However, the application of initialization potential Vini may be temporarily stopped midway through the third initialization step. More specifically, third initializer 26 may temporarily stop the application of initialization potential Vini during a period from the initial start of the application of initialization potential Vini to the final end of the application of initialization potential Vini.

Furthermore, in each of Embodiment 9 and Embodiment 10, the first initialization step may start at the start of the first non-emission step. The third initialization step may start at the start of the second non-emission step. More specifically, first initializer 22 may start the application of initialization potential Vini at the same time when first emission stopper 21 stops the current supply to light emitting element 32. Third initializer 26 may start the application of initialization potential Vini at the same time when second emission stopper 25 stops the current supply to light emitting element 32.

Furthermore, in each of Embodiment 9 and Embodiment 10, the period from the start of the first subframe period to the start of the first initialization step may be different in length from the period from the start of each of the at least one second subframe period to the start of the third initialization step. More specifically, the period from the start of the first subframe period to the start of the application of initialization potential Vini by first initializer 22 may be different in length from the period from the start of each of the at least one second subframe period to the start of the application of initialization Vini by third initializer 26.

Furthermore, the configuration of pixel circuit 30 according to Embodiment 9 and Embodiment 10 is not limited to the example of the configuration illustrated in FIG. 28. The following describes another example of the configuration of pixel circuit 30 according to Embodiment 9 and Embodiment 10, with reference to FIG. 18 and FIG. 20 described above. FIG. 18 is a schematic circuit diagram illustrating a configuration of pixel circuit 330 according to Variation 1. FIG. 20 is a schematic circuit diagram illustrating a configuration of pixel circuit 430 according to Variation 2.

As shown by pixel circuit 330 in FIG. 18 according to Variation 1, the pixel circuit according to the present disclosure need not include switch transistor 34. Thus, drive potential Vcc may be directly applied to the drain of drive transistor 33. Furthermore, as shown by pixel circuit 430 in FIG. 20 according to Variation 2, the pixel circuit according to the present disclosure need not include switch transistor 36. The pixel circuit according to the present disclosure only has to enable the application of initialization potential Vini to the source of drive transistor 33.

It should be noted that the following embodiments may also be included in one or more embodiments of the present disclosure.

(1) A part of the constituent elements included in the above-described display devices may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(2) It should also be noted that a part of the constituent elements in each of the above-described display devices may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing the LSI to execute their functions.

(3) It should also be noted that a part of the constituent elements included in each of the above-described display devices may be implemented into an Integrated Circuit (IC) card or a single module which is attachable to and removable from the display device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(4) A part of the constituent elements included in each of the above-described display devices may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium.

Furthermore, a part of the constituent elements included in each of the above-described display devices may be implemented by transmitting the computer program or the digital signals via an electric communication line, a wired or wireless communication line, a network represented by the Internet, data broadcasting, and the like.

(5) The present disclosure may be a control method of the above-described display device. The present disclosure may be computer program realized by executing the control method using a computer, or may be digital signals including the computer program. Furthermore, the present disclosure may be implemented to a non-transitory computer-readable recording medium, such as a CD-ROM, on which the computer program is recorded.

(6) The present disclosure may be a computer system including a microprocessor and a memory. The memory stores the computer program and the microprocessor operates according to the computer program.

(7) It is also possible that the program or the digital signals may be recorded onto the recording medium to be transferred, or may be transmitted via a network or the like, so that the program or the digital signals can be executed by a different independent computer system.

INDUSTRIAL APPLICABILITY

The present disclosure is useful particularly in the technological field of displays that are drivable at a low refresh rate and used for television systems, game machines, and personal computers.

The invention claimed is:

1. A control method of a display device, the display device including a plurality of pixel circuits, each of the plurality of pixel circuits including a light emitting element, a drive transistor, and a pixel capacitance, the drive transistor including a gate, a source, and a drain, the light emitting element being connected to the source, one end of the pixel capacitance being connected to the gate, and another end of the pixel capacitance being connected to the source, a frame period during which one image continues to be displayed by the display device including a first subframe period and at least one second subframe period that follows the first subframe period, the control method comprising:

in the first subframe period, (A) applying a first initialization potential, which is predetermined, to the source;

(B) writing a signal corresponding to the one image into the pixel capacitance after (A); and (C) causing the light emitting element to emit light after (B), and in each of the at least one second subframe period, (D) maintaining the light emitting element in a non-emission state;

(E) applying a second initialization potential, which is predetermined, to the source in (D); and (F) causing the light emitting element to emit light after (D).

2. The control method according to claim 1, further comprising:

in the first subframe period, (G) applying the second initialization potential to the source after (B) but before (C).

3. The control method according to claim 1, wherein in each of the at least one second subframe period, (E) is executed at an end of (D).

4. The control method according to claim 1, wherein the second initialization potential is higher than the first initialization potential.

5. The control method according to claim 1, wherein the second initialization potential is not less than a minimum value and not more than a maximum value of a potential of the source immediately after (B).

6. The control method according to claim 5, wherein the second initialization potential is an average value of the potential of the source immediately after (B).

7. The control method according to claim 1, wherein the first subframe period is equal in length to each of the at least one second subframe period.

8. The control method according to claim 1, wherein each of the plurality of pixel circuits further includes a switch transistor that is connected to the drain.

9. The control method according to claim 8, wherein the switch transistor is a p-type transistor.

10. A control method of a display device, the display device including a plurality of pixel circuits, each of the plurality of pixel circuits including a light emitting element, a drive transistor, and a pixel capacitance, the drive transistor including a gate, a source, and a drain, the light emitting element being connected to the source, one end of the pixel capacitance being connected to the gate, and another end of the pixel capacitance being connected to the source, a frame period during which one image continues to be displayed by the display device including a first subframe period and at least one second subframe period that follows the first subframe period, each of the at least one second subframe period being equal in length to the first subframe period, the control method comprising:

in the first subframe period, (H) maintaining the light emitting element in a non-emission state for a non-emission period that is predetermined; and (I) causing the light emitting element to emit light after (H), and in each of the at least one second subframe period, (J) maintaining the light emitting element in the non-emission state for the non-emission period; and (K) causing the light emitting element to emit light after (J), wherein (H) includes:

(L) applying an initialization potential, which is predetermined, to the source;

(M) writing a signal corresponding to the one image to the pixel capacitance after (L); and (N) applying the initialization potential to the source for an initialization period that is predetermined, after (M), (J) includes (O) applying the initialization potential to the source, and a period from a start of the first subframe period to an end of (N) is equal in length to a period from a start of each of the at least one second subframe period to an end of (O).

11. The control method according to claim 10, wherein (O) starts after a start of (J).

12. The control method according to claim 11, wherein a period from the start of the first subframe period to a start of (L) is equal in length to a period from the start of each of the at least one second subframe period to a start of (O).

13. The control method according to claim 10, wherein in (O), the initialization potential is continuously applied to the source from a start of (O) to the end of (O).

14. The control method according to claim 10, wherein the initialization period has a length that is at least 50% of a length of the non-emission period.

15. The control method according to claim 10, wherein the display device further includes at least one dummy pixel circuit, each of the at least one dummy pixel circuit includes a capacitive element, and in (O), the initialization potential is applied to the source of the drive transistor included in at least one pixel circuit among the plurality of pixel circuits and to the capacitive element included in each of the at least one dummy pixel circuit.

16. A display device, comprising:

a plurality of pixel circuits; and a control device that controls the plurality of pixel circuits, wherein each of the plurality of pixel circuits includes a light emitting element, a drive transistor, and a pixel capacitance, the drive transistor includes a gate, a source, and a drain, the light emitting element is connected to the source, one end of the pixel capacitance is connected to the gate, and another end of the pixel capacitance is connected to the source, a frame period during which one image continues to be displayed by the display device includes a first subframe period and at least one second subframe period that follows the first subframe period, each of the at least one second subframe period is equal in length to the first subframe period, the control device includes:

a first emission stopper that maintains the light emitting element in a non-emission state for a non-emission period that is predetermined, in the first subframe period;

a first emitter that causes the light emitting element to emit light by supplying a current to the light emitting element, in the first subframe period;

a second emission stopper that maintains the light emitting element in the non-emission state for the non-emission period, in each of the at least one second subframe period; and a second emitter that causes the light emitting element to emit light by supplying a current to the light emitting element, in each of the at least one second subframe period, the first emission stopper includes:

a first initializer that applies an initialization potential, which is predetermined, to the source for an initialization period that is predetermined;

a writer that writes a signal corresponding to the one image to the pixel capacitance; and a second initializer that applies the initialization potential to the source, the second emission stopper includes a third initializer that applies the initialization potential to the source for an initialization period that is predetermined, and a period from a start of the first subframe period to an end of application of the initialization potential by the second initializer is equal in length to a period from a start of each of the at least one second subframe period to an end of application of the initialization potential by the third initializer.

17. The display device according to claim 16, wherein the third initializer starts application of the initialization potential after the second emission stopper stops supply of a current to the light emitting element.

18. The display device according to claim 17, wherein a period from the start of the first subframe period to a start of application of the initialization potential by the first initializer is equal in length to a period from the start of each of the at least one second subframe period to a start of application of the initialization potential by the third initializer.

19. The display device according to claim 16, wherein, in the non-emission period, the third initializer continuously applies the initialization potential during a period from an initial start of application of the initialization potential to a final end of the application of the initialization potential.

20. The display device according to claim 16, wherein the initialization period has a length that is at least 50% of a length of the non-emission period.

21. The display device according to claim 16, further comprising:

at least one dummy pixel circuit, wherein each of the at least one dummy pixel circuit includes a capacitive element, and the third initializer applies the initialization potential to the source of the drive transistor included in at least one pixel circuit among the plurality of pixel circuits and to a capacitive element included in each of the at least one dummy pixel circuit.

22. The display device according to claim 21, wherein the capacitive element included in each of the at least one dummy pixel circuit is identical in structure to the light emitting element.

23. The display device according to claim 21, wherein each of the at least one dummy pixel circuit is the capacitive element.

* * * * *